US012629980B2

(12) United States Patent　　　　(10) Patent No.:　　US 12,629,980 B2
Peterson et al.　　　　　　　　　　　　(45) Date of Patent:　　　May 19, 2026

(54) E-SWAY ALGORITHM

(71) Applicant: Fox Factory, Inc., Duluth, GA (US)

(72) Inventors: Andrew Peterson, Braselton, GA (US); Richard Strickland, Winder, GA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 18/307,725

(22) Filed: Apr. 26, 2023

(65) Prior Publication Data

US 2024/0198753 A1　　　Jun. 20, 2024

Related U.S. Application Data

(60) Provisional application No. 63/363,641, filed on Apr. 26, 2022.

(51) Int. Cl.
| | |
|---|---|
| *B60G 21/055* | (2006.01) |
| *B60G 17/018* | (2006.01) |
| *B60G 17/08* | (2006.01) |
| *B60R 21/013* | (2006.01) |
| *B60R 21/13* | (2006.01) |
| *B60W 10/22* | (2006.01) |
| *B60W 40/10* | (2012.01) |
| *F16F 1/14* | (2006.01) |

(52) U.S. Cl.
CPC ....... *B60G 21/0558* (2013.01); *B60G 17/018* (2013.01); *B60G 17/08* (2013.01); *B60R 21/013* (2013.01); *B60R 21/13* (2013.01); *B60W 10/22* (2013.01); *B60W 40/10* (2013.01); *F16F 1/145* (2013.01)

(58) Field of Classification Search
None
See application file for complete search history.

(56) References Cited

U.S. PATENT DOCUMENTS

| | | | |
|---|---|---|---|
| 2,836,431 | A | 5/1958 | Antoine |
| 2,941,815 | A | 6/1960 | Josef |
| 3,357,512 | A | 12/1967 | Wilson |
| 3,602,470 | A | 8/1971 | Reynolds |
| 3,871,635 | A | 3/1975 | Unruh et al. |
| 3,986,118 | A | 10/1976 | Madigan |
| 4,159,756 | A | 7/1979 | Murakami et al. |
| 4,183,509 | A | 1/1980 | Nishikawa et al. |

(Continued)

FOREIGN PATENT DOCUMENTS

| | | | |
|---|---|---|---|
| CN | 116568533 A | * | 8/2023 |
| DE | 2849015 A1 | | 5/1980 |

(Continued)

OTHER PUBLICATIONS

European Search Report for EP Application No. 21215569.1, 9 pages, Mailed May 10, 2022.

(Continued)

*Primary Examiner* — Kevin R Steckbauer

(57) ABSTRACT

Disclosed herein is a system comprising a memory, at least one sensor, and at least one processor. The at least one processor is configured to obtain vehicle information from the at least one sensor, and determine a vehicle operation mode based on the vehicle information. The processor will further format the vehicle operation mode in a computer readable format and present the vehicle operation mode in a computer readable format.

21 Claims, 17 Drawing Sheets

1200

(56)             References Cited

U.S. PATENT DOCUMENTS

| | | | |
|---|---|---|---|
| 4,589,528 A | 5/1986 | Axthammer et al. | |
| 4,773,671 A | 9/1988 | Inagaki | |
| 4,921,080 A | 5/1990 | Lin | |
| 4,958,704 A | 9/1990 | Leiber et al. | |
| 4,984,819 A | 1/1991 | Kakizaki et al. | |
| 5,027,303 A | 6/1991 | Witte | |
| 5,035,306 A | 7/1991 | Ashiba | |
| 5,105,918 A | 4/1992 | Hagiwara et al. | |
| 5,149,131 A | 9/1992 | Sugasawa et al. | |
| 5,171,036 A | 12/1992 | Ross | |
| 5,172,785 A * | 12/1992 | Takahashi | B60W 50/06 |
| | | | 706/900 |
| 5,172,794 A | 12/1992 | Ward | |
| 5,186,486 A | 2/1993 | Hynds et al. | |
| 5,236,520 A | 8/1993 | Gallagher | |
| 5,265,703 A | 11/1993 | Ackermann | |
| 5,295,705 A | 3/1994 | Butsuen et al. | |
| 5,362,094 A | 11/1994 | Jensen | |
| 5,390,949 A | 2/1995 | Naganathan et al. | |
| 5,522,280 A | 6/1996 | Bexten | |
| 5,597,180 A | 1/1997 | Ganzel et al. | |
| 5,624,105 A | 4/1997 | Runkel | |
| 5,630,623 A | 5/1997 | Ganzel | |
| 5,899,472 A | 5/1999 | Burke et al. | |
| 5,921,360 A | 7/1999 | Moradmand | |
| 5,952,823 A | 9/1999 | Sprecher et al. | |
| 5,987,366 A | 11/1999 | Jun | |
| 6,073,536 A | 6/2000 | Campbell | |
| 6,135,434 A * | 10/2000 | Marking | F16F 9/062 |
| | | | 188/315 |
| 6,244,398 B1 | 6/2001 | Girvin et al. | |
| 6,250,658 B1 | 6/2001 | Sakai | |
| 6,276,693 B1 | 8/2001 | Oakley et al. | |
| 6,427,812 B2 | 8/2002 | Crawley et al. | |
| 6,457,730 B1 | 10/2002 | Urbach | |
| 6,520,510 B1 | 2/2003 | Germain et al. | |
| 6,669,208 B1 * | 12/2003 | Monk | B60G 21/067 |
| | | | 280/5.506 |
| 6,863,291 B2 | 3/2005 | Miyoshi | |
| 6,935,157 B2 | 8/2005 | Miller | |
| 7,234,714 B2 | 6/2007 | Germain et al. | |
| 7,374,028 B2 | 5/2008 | Fox | |
| 7,384,053 B1 | 6/2008 | Boecker et al. | |
| 7,472,914 B2 | 1/2009 | Anderson et al. | |
| 7,484,603 B2 | 2/2009 | Fox | |
| 7,997,588 B2 | 8/2011 | Ohnuma et al. | |
| 8,220,807 B2 | 7/2012 | Lorenzon et al. | |
| 8,534,687 B2 | 9/2013 | Coombs et al. | |
| 8,550,223 B2 | 10/2013 | Cox et al. | |
| 8,627,932 B2 | 1/2014 | Marking | |
| 8,807,542 B2 | 8/2014 | Wootten et al. | |
| 8,838,335 B2 | 9/2014 | Bass et al. | |
| 8,857,580 B2 | 10/2014 | Marking | |
| 8,899,560 B2 * | 12/2014 | Allen | F16F 9/44 |
| | | | 188/313 |
| 8,955,653 B2 | 2/2015 | Marking | |
| 9,033,122 B2 | 5/2015 | Ericksen et al. | |
| 9,058,038 B2 * | 6/2015 | Zhang | G05B 23/024 |
| 9,120,362 B2 | 9/2015 | Marking | |
| 9,239,090 B2 | 1/2016 | Marking et al. | |
| 9,303,712 B2 | 4/2016 | Cox | |
| 9,340,088 B2 * | 5/2016 | Otake | B60G 17/0162 |
| 9,353,818 B2 | 5/2016 | Marking | |
| 9,452,654 B2 | 9/2016 | Ericksen et al. | |
| 9,471,697 B2 * | 10/2016 | Lortz | G06F 16/9554 |
| 9,491,788 B1 | 11/2016 | Kasai et al. | |
| 9,623,716 B2 | 4/2017 | Cox | |
| 9,682,604 B2 | 6/2017 | Cox et al. | |
| 9,797,467 B2 | 10/2017 | Wootten et al. | |
| 10,036,443 B2 | 7/2018 | Galasso et al. | |
| 10,040,329 B2 | 8/2018 | Ericksen et al. | |
| 10,047,817 B2 | 8/2018 | Ericksen et al. | |
| 10,060,499 B2 * | 8/2018 | Ericksen | F16F 9/464 |
| 10,086,673 B2 | 10/2018 | Baales et al. | |
| 10,415,662 B2 | 9/2019 | Marking | |

| | | | |
|---|---|---|---|
| 10,443,671 B2 | 10/2019 | Marking | |
| 10,737,546 B2 | 8/2020 | Tong | |
| 10,825,266 B2 * | 11/2020 | Srinivasan | H04W 4/44 |
| 10,933,710 B2 | 3/2021 | Tong | |
| 10,981,429 B2 * | 4/2021 | Tsiaras | C12N 9/0006 |
| 11,097,590 B2 * | 8/2021 | Simula | B60G 17/0162 |
| 11,173,767 B2 | 11/2021 | Cox | |
| 11,192,424 B2 | 12/2021 | Tabata et al. | |
| 11,584,182 B1 * | 2/2023 | Smith | B60G 21/0553 |
| 11,634,003 B2 * | 4/2023 | Negishi | B60G 21/0558 |
| | | | 280/124.106 |
| 11,878,678 B2 | 1/2024 | Krosschell et al. | |
| 11,904,648 B2 * | 2/2024 | Graus | B60G 17/08 |
| 11,926,189 B2 * | 3/2024 | Tsiaras | C12N 9/0006 |
| 11,993,121 B1 | 5/2024 | Schubart et al. | |
| 12,033,445 B1 * | 7/2024 | Mishra | G07C 5/0816 |
| 12,083,850 B2 * | 9/2024 | Strickland | F16F 9/20 |
| 12,404,847 B2 | 9/2025 | Schubart et al. | |
| 12,545,072 B2 | 2/2026 | Cox | |
| 2002/0125675 A1 | 9/2002 | Clements et al. | |
| 2004/0113377 A1 | 6/2004 | Klees | |
| 2004/0173985 A1 | 9/2004 | Bruhl et al. | |
| 2004/0231904 A1 | 11/2004 | Beck et al. | |
| 2005/0077696 A1 | 4/2005 | Ogawa | |
| 2005/0082127 A1 | 4/2005 | Barber et al. | |
| 2006/0287791 A1 | 12/2006 | Boon et al. | |
| 2007/0235955 A1 | 10/2007 | Mizukoshi et al. | |
| 2008/0129000 A1 | 6/2008 | Munday et al. | |
| 2008/0203694 A1 | 8/2008 | Gartner et al. | |
| 2009/0140501 A1 | 6/2009 | Taylor et al. | |
| 2009/0267311 A1 | 10/2009 | Ohnuma et al. | |
| 2010/0225084 A1 | 9/2010 | Chapman et al. | |
| 2012/0018263 A1 | 1/2012 | Marking | |
| 2012/0205843 A1 * | 8/2012 | Allen | B60G 15/12 |
| | | | 267/64.25 |
| 2013/0197755 A1 * | 8/2013 | Otake | B60G 17/0162 |
| | | | 701/38 |
| 2013/0228404 A1 | 9/2013 | Marking | |
| 2013/0262067 A1 * | 10/2013 | Zhang | G05B 23/024 |
| | | | 703/8 |
| 2013/0292218 A1 * | 11/2013 | Ericksen | B62K 25/08 |
| | | | 188/266.2 |
| 2014/0008160 A1 | 1/2014 | Marking et al. | |
| 2014/0187149 A1 * | 7/2014 | Lortz | H04W 76/14 |
| | | | 455/41.1 |
| 2014/0224606 A1 | 8/2014 | Baales et al. | |
| 2014/0239602 A1 | 8/2014 | Blankenship et al. | |
| 2015/0083535 A1 | 3/2015 | Ericksen et al. | |
| 2015/0224845 A1 | 8/2015 | Avadhany et al. | |
| 2015/0290991 A1 | 10/2015 | Cox | |
| 2016/0265615 A1 | 9/2016 | Marking | |
| 2017/0120713 A1 | 5/2017 | Drozdowski et al. | |
| 2017/0129302 A1 | 5/2017 | Jackson | |
| 2017/0136842 A1 | 5/2017 | Anderson et al. | |
| 2017/0282669 A1 | 10/2017 | Cox et al. | |
| 2018/0198846 A1 * | 7/2018 | Srinivasan | H04L 63/083 |
| 2018/0345747 A1 | 12/2018 | Boon et al. | |
| 2019/0001775 A1 | 1/2019 | Anderson et al. | |
| 2019/0100071 A1 * | 4/2019 | Tsiaras | C12P 17/12 |
| 2019/0241039 A1 * | 8/2019 | Simula | B60G 21/0551 |
| 2019/0360505 A1 | 11/2019 | Belter et al. | |
| 2020/0180385 A1 | 6/2020 | Marking | |
| 2020/0332496 A1 * | 10/2020 | Natzke | F02D 41/021 |
| 2021/0061052 A1 | 3/2021 | Kim | |
| 2021/0086581 A1 | 3/2021 | Smith | |
| 2021/0114431 A1 | 4/2021 | Cox | |
| 2021/0197640 A1 | 7/2021 | Yamashita | |
| 2021/0229519 A1 * | 7/2021 | Tsiaras | C12N 9/1029 |
| 2021/0309063 A1 * | 10/2021 | Negishi | B60K 35/10 |
| 2021/0309064 A1 * | 10/2021 | Negishi | B60K 35/28 |
| 2021/0316716 A1 | 10/2021 | Krosschell et al. | |
| 2022/0016949 A1 * | 1/2022 | Graus | B60G 17/08 |
| 2022/0105777 A1 | 4/2022 | Cox | |
| 2022/0134835 A1 | 5/2022 | Izak et al. | |
| 2022/0144035 A1 | 5/2022 | Al Sakka et al. | |
| 2022/0176769 A1 | 6/2022 | Tong | |
| 2022/0194161 A1 * | 6/2022 | Negishi | B60G 21/0556 |
| 2022/0242186 A1 | 8/2022 | Tong | |
| 2022/0242190 A1 | 8/2022 | Stanford et al. | |

(56)                References Cited

U.S. PATENT DOCUMENTS

| | | | |
|---|---|---|---|
| 2022/0355638 A1 | 11/2022 | Worley | |
| 2022/0388362 A1 | 12/2022 | Graus et al. | |
| 2023/0111759 A1 | 4/2023 | Vandersmissen et al. | |
| 2023/0113777 A1 | 4/2023 | Vandersmissen et al. | |
| 2023/0113819 A1 | 4/2023 | Vandersmissen et al. | |
| 2023/0114717 A1 | 4/2023 | Boon et al. | |
| 2023/0115594 A1 | 4/2023 | Calchand et al. | |
| 2023/0202252 A1* | 6/2023 | Smith | B60G 17/02 |
| | | | 701/37 |
| 2023/0249702 A1* | 8/2023 | Peterson | B60G 17/017 |
| | | | 701/36 |
| 2023/0256785 A1 | 8/2023 | Worley | |
| 2023/0271473 A1* | 8/2023 | Strickland | B60G 21/0558 |
| | | | 280/124.106 |
| 2023/0294603 A1 | 9/2023 | Dwyer et al. | |
| 2023/0302865 A1* | 9/2023 | Tong | B60G 17/08 |
| 2023/0302866 A1* | 9/2023 | Tong | B60G 13/14 |
| 2023/0302867 A1* | 9/2023 | Tong | B60G 11/265 |
| 2024/0100904 A1* | 3/2024 | Negishi | B60G 17/0157 |
| 2024/0131892 A1* | 4/2024 | Graus | B60G 17/01908 |
| 2024/0198753 A1* | 6/2024 | Peterson | B60W 40/10 |
| 2024/0286452 A1 | 8/2024 | Jensen et al. | |
| 2024/0375474 A1* | 11/2024 | Tsiaras | C12N 9/88 |
| 2025/0083489 A1* | 3/2025 | Strickland | F16F 9/063 |

FOREIGN PATENT DOCUMENTS

| | | | | |
|---|---|---|---|---|
| DE | 102005045177 A1 | 3/2007 | | |
| DE | 112005003567 T5 | 3/2008 | | |
| DE | 102012006928 A1 | 11/2012 | | |
| DE | 202013100681 U1 | 4/2013 | | |
| DE | 202013007733 U1 | 10/2013 | | |
| DE | 102021104176 A1 | 8/2021 | | |
| EP | 0648625 A1 | 4/1995 | | |
| EP | 0829383 A2 | 3/1998 | | |
| EP | 1000782 A2 | 5/2000 | | |
| EP | 1022169 A2 | 7/2000 | | |
| EP | 1238833 A1 | 9/2002 | | |
| EP | 2123933 A2 | 11/2009 | | |
| EP | 1961649 B1 | 12/2010 | | |
| EP | 3461663 A1 | 4/2019 | | |
| EP | 4112339 A1 | 1/2023 | | |
| EP | 4197830 A1 * | 6/2023 | | F16F 9/065 |
| EP | 4253106 A1 * | 10/2023 | | B60G 21/06 |
| EP | 4269137 A1 * | 11/2023 | | F16F 1/145 |
| FR | 2927020 A1 | 8/2009 | | |
| FR | 3040331 A1 | 3/2017 | | |
| FR | 3101809 A1 | 4/2021 | | |
| GB | 2006131 A | 5/1979 | | |
| GB | 2343663 A | 5/2000 | | |
| GB | 2351951 A | 1/2001 | | |
| GB | 2377415 A * | 1/2003 | | B60G 21/0556 |
| GB | 2377415 B * | 9/2003 | | B60G 21/0556 |
| JP | S61146612 A | 7/1986 | | |
| JP | H0419210 A | 1/1992 | | |
| JP | H04191115 A | 7/1992 | | |
| JP | H11165521 A | 6/1999 | | |
| JP | 2001105827 A | 4/2001 | | |
| JP | 2002264625 A | 9/2002 | | |
| JP | 2016211676 A | 12/2016 | | |
| WO | 0166969 A1 | 9/2001 | | |
| WO | 03008215 A1 | 1/2003 | | |
| WO | 2016060066 A1 | 4/2016 | | |
| WO | 2018215176 A1 | 11/2018 | | |
| WO | 2020214666 A1 | 10/2020 | | |
| WO | WO-2022016155 A1 * | 1/2022 | | B60G 21/0558 |

OTHER PUBLICATIONS

Extended European Search Report for EP Application 22177563.8, dated Nov. 11, 2022, 14 pages.

Extended European Search Report for EP Application 18197941.0 dated Feb. 27, 2019, 11 pages.

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

European Examination Report for EP Application No. 21215569.1, 9 pages, Mailed May 16, 2024.

European Search Report for European Application No. 22215230.8, 9 Pages, Apr. 4, 2023.

European Search Report for European Application No. 23170219.2, 9 Pages, Aug. 22, 2023.

European Examination Report for EP Application No. 21215569.1, 5 pages, Mailed Jan. 8, 2025.

European Extended Search Report for European Application No. 20879677.1, 8 Pages, Mailed Oct. 23, 2023.

European Search Report for European Application No. 23158363.4, 8 pages, Sep. 6, 2023.

PCT International Search Report for PCT/US2020/056869, 11 Pages, Mailed Jan. 12, 2021.

* cited by examiner

500

600

800

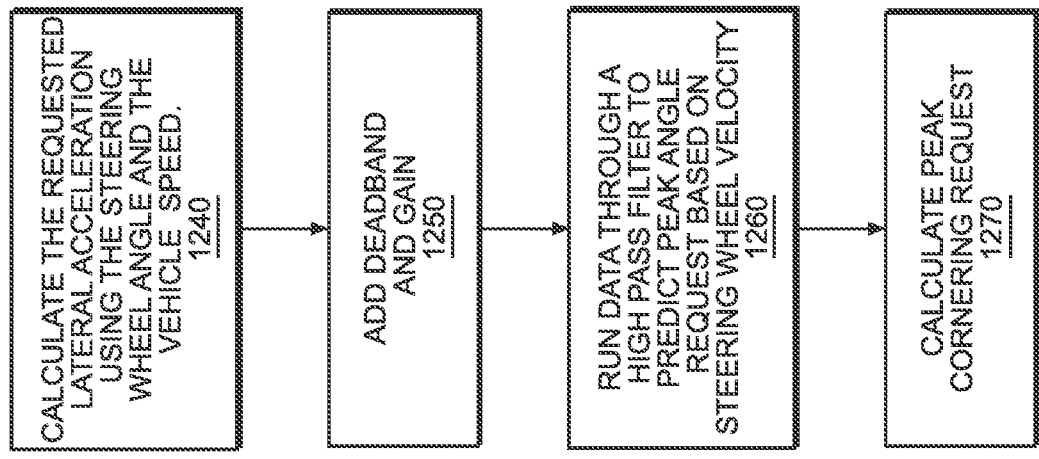

CALCULATE THE REQUESTED LATERAL ACCELERATION USING THE STEERING WHEEL ANGLE AND THE VEHICLE SPEED. 1240

ADD DEADBAND AND GAIN 1250

RUN DATA THROUGH A HIGH PASS FILTER TO PREDICT PEAK ANGLE REQUEST BASED ON STEERING WHEEL VELOCITY 1260

CALCULATE PEAK CORNERING REQUEST 1270

FIG. 12

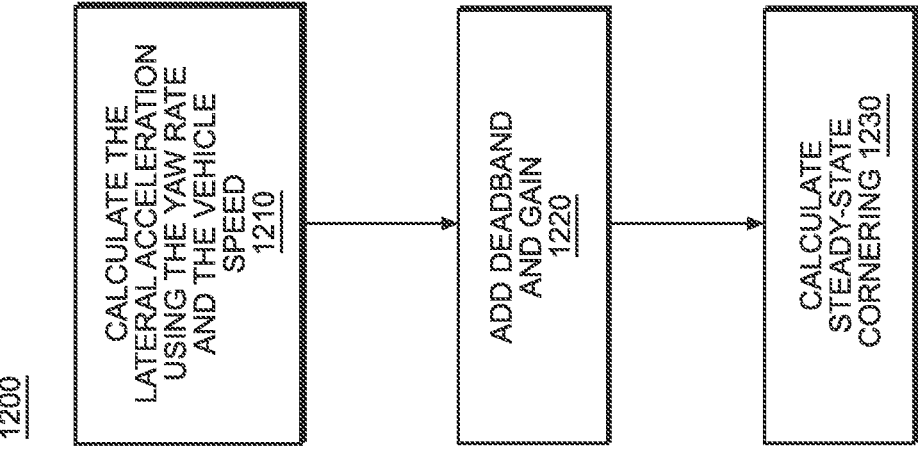

1200

CALCULATE THE LATERAL ACCELERATION USING THE YAW RATE AND THE VEHICLE SPEED 1210

ADD DEADBAND AND GAIN 1220

CALCULATE STEADY-STATE CORNERING 1230

E-SWAY ALGORITHM

CROSS-REFERENCE TO RELATED APPLICATIONS (PROVISIONAL)

This application claims priority to and benefit of U.S. Provisional Patent Application No. 63/363,641, filed Apr. 26, 2022, entitled "E-SWAY ALGORITHM" by Andrew Peterson et al., assigned to the assignee of the present application, which is herein incorporated by reference in its entirety.

FIELD OF THE INVENTION

Embodiments of the invention generally relate to methods and apparatus for use in vehicle suspension and sway bars.

BACKGROUND OF THE INVENTION

Vehicle suspension systems typically include a spring component or components and a damping component or components that form a suspension to provide for a comfortable ride, enhance performance of a vehicle, and the like. For example, a firmer suspension is usually preferred on smooth terrain while a softer suspension is often the choice for an off-road or bumpier environment.

A sway bar (anti-sway bar, roll bar, anti-roll bar, stabilizer bar) is a part of an automobile suspension that reduces the body roll of a vehicle.

BRIEF DESCRIPTION OF THE DRAWINGS

FIG. 12 is a flow chart illustrating a method for a predictive cornering algorithm, in accordance with an embodiment.

Figure 1A:
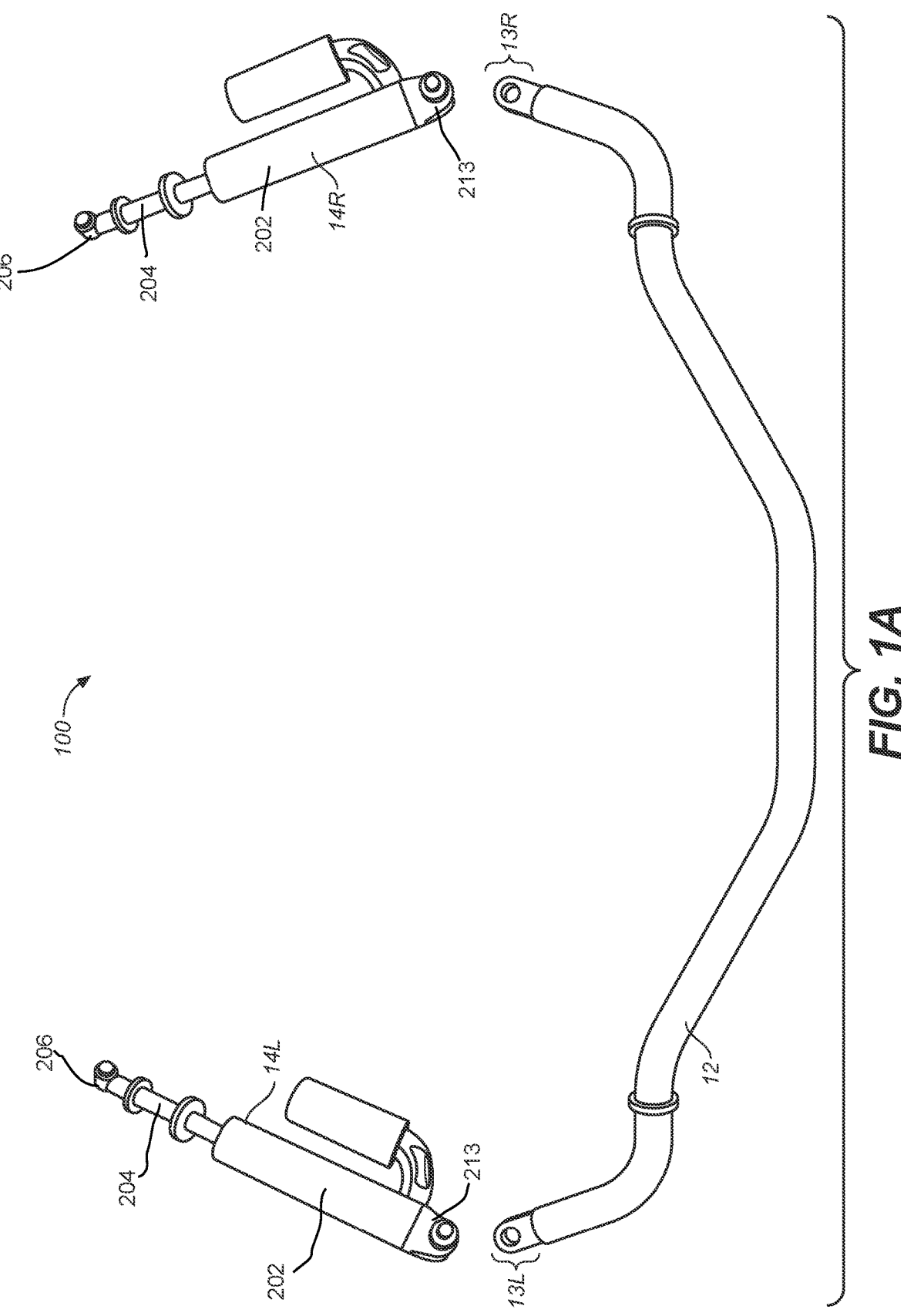
FIG. 1A is a perspective view of a sway bar system including a sway bar and two electronically controlled damper links, in accordance with one embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

For purposes of the following discussion, power spectral density refers to a form of data such as frequency, amplitude, time, location (e.g., GPS location), or a combination thereof. This data can be used in a graph, a surface, or an algorithm to establish damper settings (e.g., suspension settings) that are associated with a given power spectral density.

In the following discussion, embodiments of the sway bar system (also referred to herein as an "E-Sway Bar" system) are described in detail. As will be described below, embodiments of the sway bar system advantageously enable remote input (e.g., manual remote input or automatic remote input) to manipulate the stiffness of the sway bar system. The stiffness of the sway bar system can be thought of as, for example, a driver's (or passenger's) perception of the "roll stability" of the vehicle. In other words, the perception of the driver (or passenger) of the vehicle for the vehicle to resist or allow "roll motion". As one example, when riding in a vehicle (e.g., a sports car) which appears to provide significant resistance to a rolling motion of the vehicle, it can be said that the vehicle has a "stiff" sway bar system. As another example, when riding in a vehicle (e.g., a motorhome or bus) which appears to not provide significant resistance to a rolling motion of the vehicle, it can be said that the vehicle has a "soft" sway bar system.

It will be understood that a "soft" sway bar system is desired in various conditions. For example, a soft sway bar system provides better vehicle suspension performance during rock crawling and some slow driving activities. However, in a regular or higher speed driving situation, a "soft" sway bar system could make a driver or passengers feel motion sickness, provide a lack of steering control, and ultimately lead to a vehicle rollover or other loss of control accident.

In one embodiment, the physical disconnection of the sway bar from the suspension will provide additional performance enhancements and capabilities during slow maneuvering such as rock crawling, 4-wheeling, and other slower driving/obstacle clearing activities where maximum suspension articulation is desired, needed, and/or warranted. Further, it will be understood that "stiff" sway bar system is desired in various conditions such as normal speed driving, faster speed driving, or driving in a location or conditions that are not rock crawling and other slower driving/obstacle clearing activities, e.g., in locations where maximum articulation is not more important than ensuring the vehicle does not tip over due to body roll, or the like.

In contrast, in one embodiment a "soft" or range of softer settings of a connected sway bar system provides increased handling and body roll control during normal speed cornering and various driving activities. For example, it will be understood that a stiff sway bar system provides increased handling and control during high-speed cornering and various racing activities.

In one embodiment, a "hard" or range of settings from medium to all the way locked out settings of a connected sway bar system will provide increased handling and body roll control during high-speed cornering and various racing activities.

Further, in the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension").

In a conventional "fully active suspension", a motive source such as, for example, an actuator, is used to move (e.g. raise or lower) a wheel with respect to the vehicle. In a "semi-active suspension", no motive force/actuator is employed to move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to move (e.g. raise or lower) a wheel with respect to the vehicle. As such, it will be understood that an "active valve" or a "remotely controllable active valve", as defined above, is well suited for use in a "fully active suspension" or a "semi-active suspension".

In one embodiment, the damping characteristic of at least one damper is obtained by controlling a remotely adjustable remotely controllable active valve (may also be referred to as a remotely adjustable electronic valve or, more concisely, as just an remotely controllable active valve) of the damper, wherein the remotely adjustable remotely controllable active valve utilizes a relatively small solenoid (using relatively low amounts of power) to generate relatively large damping forces. Examples of such a remotely controllable active and semi-active valves and their features are described and shown in U.S. Pat. Nos. 8,627,932; 8,857,580; 9,033,122; 9,120,362; and 9,239,090 the content of which are incorporated by reference herein, in their entirety.

In the following discussion the term vehicle setup information is used. In one embodiment, the vehicle setup information includes one or a plurality of modifiable parameters of a vehicle, components of the vehicle, or components working in concert with the vehicle, e.g., "vehicle parameters". In one embodiment, the vehicle setup information would include suspension settings (e.g., a suspension tune), engine performance settings (e.g., an engine tune), and the like. In one embodiment, vehicle setup information can also refer to one or more of sensor settings (e.g., granularity, weighting, etc.), location information (e.g., locations and location specific settings (e.g., geofences, and the like where setting changes are related to changes in location), terrain type, altitude, temperature, weather, and the like. In one embodiment, vehicle setup information can also refer to one or more tangibly related components such as seat shock assemblies, wheel/tire pressure settings, prosthetic settings, and the like.

As discussed herein, vehicle setup information is used for one or a plurality of vehicle parameters. In one embodiment, the vehicle parameters can include settings for one or a plurality of the components of a suspension, engine performance, terrain settings, and the like. In one embodiment, the vehicle parameters can include parameters for components that are found on vehicle such as a bicycle, a motorized bicycle, a motorcycle, a watercraft (e.g., boat, jet ski, PWC, etc.), a snow machine, a single wheeled vehicle, a multi-wheeled vehicle, a side-by-side, an on- and/or off-road vehicle, or the like. In general, a motorized bike can include a bike with a combustion motor, an electric bike (e-bike), a hybrid electric and combustion bike, a hybrid motor and pedal powered bike, and the like.

For the sake of clarity and brevity, it should be understood that the example of a four wheeled vehicle such as an automobile with a sway bar will be used, however the scope of the invention is not limited to such.

The locally shared vehicle parameters can include settings for shock assembly preload, stiffness and/or softness for rebound and/or compression, lockout settings, and the like. In one embodiment, the shock assembly could be part of a suspension assembly coupling the sprung mass to the unsprung mass of the vehicle, a seat suspension shock assembly, a prosthetic shock assembly, an electronic sway bar (E-sway bar), connected (smart) components (such as, but not limited to, those discussed herein), and the like.

In a multi-wheeled vehicle, such as for example, a car, truck, side-by-side, an on-road and/or off-road vehicle, or the like, the suspension tune could modify the tune for an E-sway bar. For example, E-sway bar tune information can include disconnecting the E-sway bar for soft, rocky, and/or sandy terrain, connecting the E-sway bar for harder surfaces, higher speeds, etc. In one embodiment, the E-sway bar tune would provide one or more threshold speeds, locations, terrain determinations and the like and adjust the E-sway bar connection based on the present vehicle speed, terrain being traversed, and the like.

In the following discussion, and for purposes of clarity, a four wheeled vehicle is utilized as the example vehicle having one or more suspension components and the use of a tune thereon. However, as discussed herein, the vehicle may be another type of vehicle and/or a component of a vehicle, prosthetic apparatus, or the like. Thus, where the discussion is directed toward tunes, settings, and the like, it should be appreciated that those discussions would be applicable to any other vehicle having the same or similar components. For example, the shock assembly of a car is used in the suspension discussion. However, the shock assembly of a bicycle, truck, snowmobile, motorcycle, prosthetic, or the like that has one or more tunable features would also similarly be able to utilize the vehicle setup information capabilities.

In general, an active valve system uses one or more sensors to essentially read the terrain. The goal is to discern if the vehicle is experiencing bumpy or smooth terrain and then change the suspension characteristics accordingly. For example, on smooth terrain, the suspension is in the firm mode; in bumpy terrain, the suspension is in the soft mode. In one embodiment, the active adjustment of suspension characteristics is accomplished using aspects such as when the sensor's signal exceeds a configurable threshold, the active valve system opens solenoids in the rear shock and/or front fork, putting one or both in soft mode. After a configurable period of time (e.g., 500 ms) where no further bumps are detected, the shock and/or fork return to firm mode.

In one embodiment, there are several other active adjustments that can be made by the active valve system. For example, the above threshold and timer values can be changed based on the incline/decline angle of the vehicle.

For example, there can be one set of configurable thresholds and timers for decline mode, another for flat riding, and yet another set for climbing. Moreover, the angles that constitute decline, flat or incline modes are also configurable. Finally, the active valve system has control style adjustment characteristics that dictate whether two or more of the suspension dampers work together (both going to soft mode together, for example), or independently.

The active valve system also allows for groups of the above settings to be packaged as a set, called a "tune". These groupings allow users to swap tunes conveniently and quickly as they encounter new terrain or ride conditions. In one embodiment, the active valve controller has the capability to store a given number of tunes, such that each stored tune would be instantly available during the ride.

In one embodiment, the application (e.g., a FOX® Live Valve® application) runs on a computing system. In one embodiment, the application is written in Python, a platform-independent programming language. In one embodiment, the equipment used to make settings changes to an active valve controller (e.g., a FOX® Live Valve® controller) includes the computer system and a communication interface (such as a USB-NFC dongle).

In one embodiment, the application allows the user to: read settings via NFC from an active valve controller, from a file on a storage device, or the like; Edit tune names, thresholds, timers, control styles, incline angles, and the like; Save settings to the active valve controller or to a file on a storage device; and the like. In one embodiment, a separate device (e.g., a mobile device) is used to adjust the tune settings. In one embodiment, an interface on the vehicle allows for adjustments to the tune settings.

In one embodiment, the application also automatically saves settings or backup files anytime the source (vehicle or file) is modified; allows users to load, view and edit backup files; prevents a user from entering any invalid settings values; provides a history of all user actions in a scrollable log; and the like.

Thus, the application can make adjustments to a range of settings which affect how the active valve suspension behaves under a variety of conditions. The settings can be downloaded wirelessly directly to a vehicle controller, saved to a configuration file for use at a later time or on other vehicles, and the like. In one embodiment, when settings from a vehicle is uploaded or downloaded, a copy of the vehicle's previous settings is saved to a backup configuration file.

The sway bar is basically a torsion spring that resists body roll motions. Often, it is formed from a cylindrical steel bar patterned in a "U" shape. A conventional sway bar assembly includes a sway bar and also includes two end links. Typically, the first of the two end links is flexibly coupled to one end of the sway bar, and the second of the two end links is flexibly coupled to the other end of the sway bar. Each of the two end links are then connected to a location on the vehicle near a wheel or axle (such as coupled to a control arm or other suspension feature) at respective left and right sides of the suspension for the vehicle. As a result, when the left and right sides of the suspension move together, the sway bar rotates about its mounting points. However, when the left and right sides of the suspension move relative to one another, the sway bar is subjected to torsion and forced to twist. The twisting of the sway bar transfers the forces between a heavily-loaded suspension side (the side of the vehicle subjected to more roll movement force than the other side of the vehicle) to the opposite, lesser-loaded, suspension side (the side of the vehicle subjected to lesser roll movement force than the other side of the vehicle).

Operation

Referring now to FIG. 1A, a perspective view of a sway bar system 100 including a sway bar 12 and two electronically controlled damper links, 14L and 14R, is shown in accordance with one embodiment. For purposes of clarity, in FIG. 1A, electronically controlled damper link 14L and electronically controlled damper link 14R are shown slightly separated from sway bar 12 in order to more clearly depict the location of connection 13L, where electronically controlled damper link 14L couples to sway bar 12, and to more clearly depict the location, 13R, where electronically controlled damper link 14R couples to sway bar 12. In various embodiments of sway bar system 100, an upper portion of electronically controlled damper link 14L includes a bushing, or similar coupling feature, to readily enable coupling of electronically controlled damper link 14L to, for example, at connection 13L of sway bar 12. Similarly, in various embodiments of sway bar system 100, an upper portion of electronically controlled damper link 14R includes a bushing, or similar coupling feature, to readily enable coupling of electronically controlled damper link 14R to, for example, 13R of sway bar 12. It should be noted that sway bar system 100 is not limited solely to the use of a bushing for coupling one or both of electronically controlled damper link 14L and electronically controlled damper link 14R to sway bar 12.

With reference still to FIG. 1A, in various embodiments of sway bar system 100, a lower portion of electronically controlled damper link 14L includes an eyelet, or similar coupling feature, to readily enable coupling of electronically controlled damper link 14L to a location on a vehicle. Similarly, in various embodiments of sway bar system 100, a lower portion of electronically controlled damper link 14R includes an eyelet, or similar coupling feature, to readily enable coupling of electronically controlled damper link 14R to a location on a vehicle. It should be noted that sway bar system 100 is not limited solely to the use of an eyelet for coupling one or both of electronically controlled damper link 14L and electronically controlled damper link 14R to a vehicle.

Although the embodiment of FIG. 1A, depicts sway bar system 100 having two electronically controlled damper links 14L and 14R, in another embodiment, sway bar system 100 includes only a single electronically controlled damper link (e.g., only 14L or only 14R). In such an embodiment, an electronically controlled damper link (e.g., 14L or 14R) is coupled to one end (e.g., a first end) of sway bar 12, and, for example, a conventional end link is coupled to the other end (e.g., a second end) of sway bar 12. Hence, sway bar system 100 is well suited to embodiments in which one end of sway bar 12 has an electronically controlled damper link (e.g., 14L or 14R) coupled thereto, and also to embodiments in which both ends of sway bar 12 have an electronically controlled damper link (e.g., 14L and 14R, respectively) coupled thereto. Additionally, for purposes of conciseness and clarity, portions of the following description may refer to an electronically controlled damper link as "electronically controlled damper link 14", instead repeating the same description for each of electronically controlled damper link 14L and electronically controlled damper link 14R. It should be noted that such portions of the description are applicable to either electronically controlled damper link 14L or electronically controlled damper link 14R, as shown in sway bar system 100 of FIG. 1A. Further, the description will pertain to embodiments in which one end of sway bar 12 has an electronically controlled damper electronically controlled damper link (e.g., 14L or 14R) coupled thereto, and also to embodiments in which both ends of sway bar 12 have an electronically controlled damper link (e.g., 14L and 14R, respectively) coupled thereto.

Also included in FIG. 1A are body 202, shaft 204, connector 206, and connection 213. In some embodiments, shaft 204 is a through shaft.

Figure 1B:
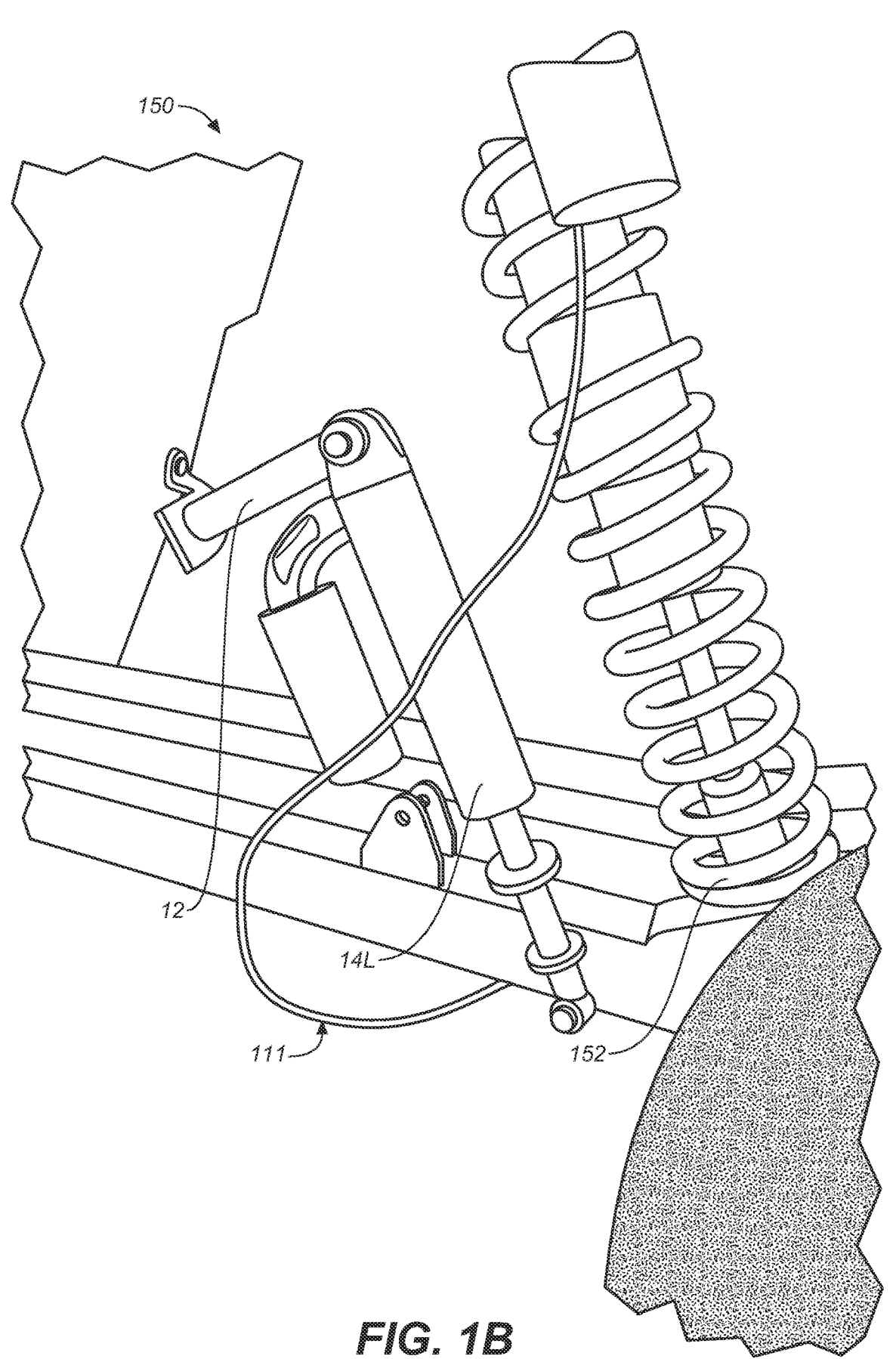
FIG. 1B is a perspective view of sway bar system, of FIG. 1A, installed in a vehicle, in accordance with one embodiment.

With reference now to FIG. 1B, a perspective view 150 is provided of sway bar system 100, of FIG. 1A, installed in a vehicle, in accordance with one embodiment. In the embodiment of FIG. 1B, sway bar 12 and at least one electronically controlled damper link 14L is shown installed in a vehicle 152. In one embodiment, sway bar system 100 is coupled to a vehicle with at least one end of sway bar 12 coupled to the vehicle by an electronically controlled damper link (e.g., 14L or 14R). That is, unlike conventional sway bar assemblies, in one embodiment, sway bar system 100 has one end of sway bar 12 coupled to a vehicle by an electronically controlled damper link (e.g., 14L or 14R).

In one embodiment, sway bar system 100 has both ends of sway bar 12 coupled to a vehicle by an electronically controlled damper link (e.g., 14L and 14R, respectively). As a result, and as will be described further below, the "stiffness" provided by sway bar system 100 can be remotely controlled by controlling the stiffness or compliance of one or both of electronically controlled damper links 14L and 14R coupling sway bar 12 to a vehicle Importantly, FIG. 1B further shows a cable 111. Cable 111 is used to provide input to electronically controlled damper link 14. Such input is used to control the damping characteristics of electronically controlled damper link 14. In various embodiments, as are described below in detail, such input may consist of electrical input (based upon, e.g., user input, sensors-derived data, or any of various other sources) used to control an electronic valve within electronically controlled damper link 14 and, correspondingly, control the damping characteristics of electronically controlled damper link 14. Embodiments of the sway bar system 100 are also well suited to using a wireless signal (in addition to, or in lieu of, cable 111) to control a valve or other component of electronically controlled damper link 14 such that, ultimately, the damping characteristic of electronically controlled damper link 14 is controllable.

Figure 1C:
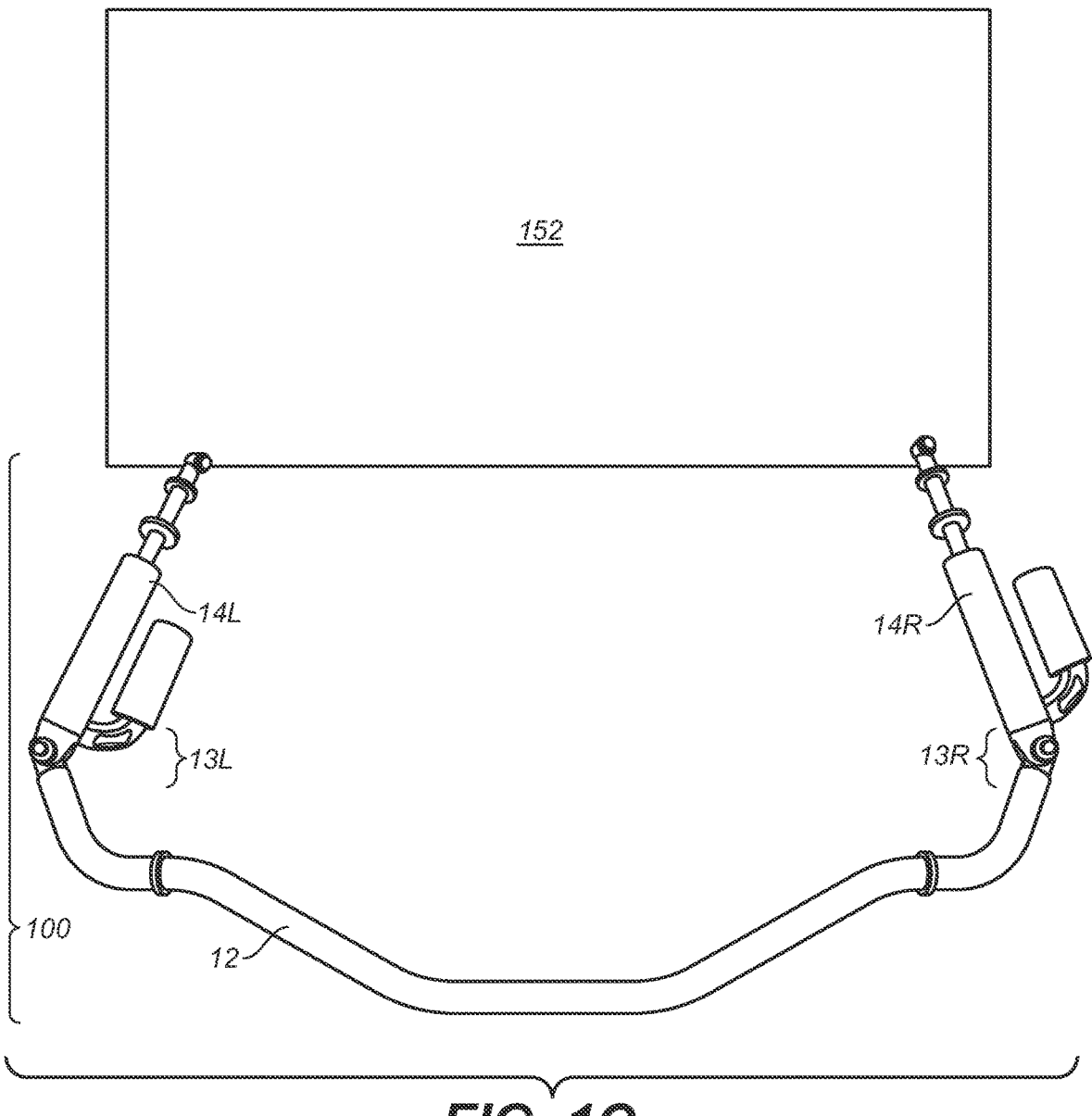
FIG. 1C is a perspective view is provided of sway bar system having electronically controlled damper link coupled to a first end of sway bar.

Referring now to FIG. 1C, a perspective view is provided of sway bar system 100 having electronically controlled damper link 14L coupled to a first end of sway bar 12 at location 13L. In the embodiment of FIG. 1C, sway bar system 100 further includes electronically controlled damper link 14R coupled to a second end of sway bar 12 at location 13R. Additionally, as schematically depicted in FIG. 1C, in the embodiment, electronically controlled damper link 14L is coupled to vehicle 152, and electronically controlled damper link 14R is coupled to vehicle 152. In one embodiment, electronically controlled damper link 14L and electronically controlled damper link 14R are coupled to vehicle 152 at a location, for example, near a wheel or axle (such as coupled to a control arm or other suspension feature) of vehicle 152 at respective left and right sides of vehicle 152. It will be understood that when the left and right sides of the suspension of vehicle 152 move relative to one another, sway bar 12 of sway bar system 100 is subjected to torsion and forced to twist. The twisting of sway bar 12 will transfer forces between a heavily-loaded suspension side of vehicle 152 to the opposite, lesser-loaded, suspension side of vehicle 152.

Figure 1D:
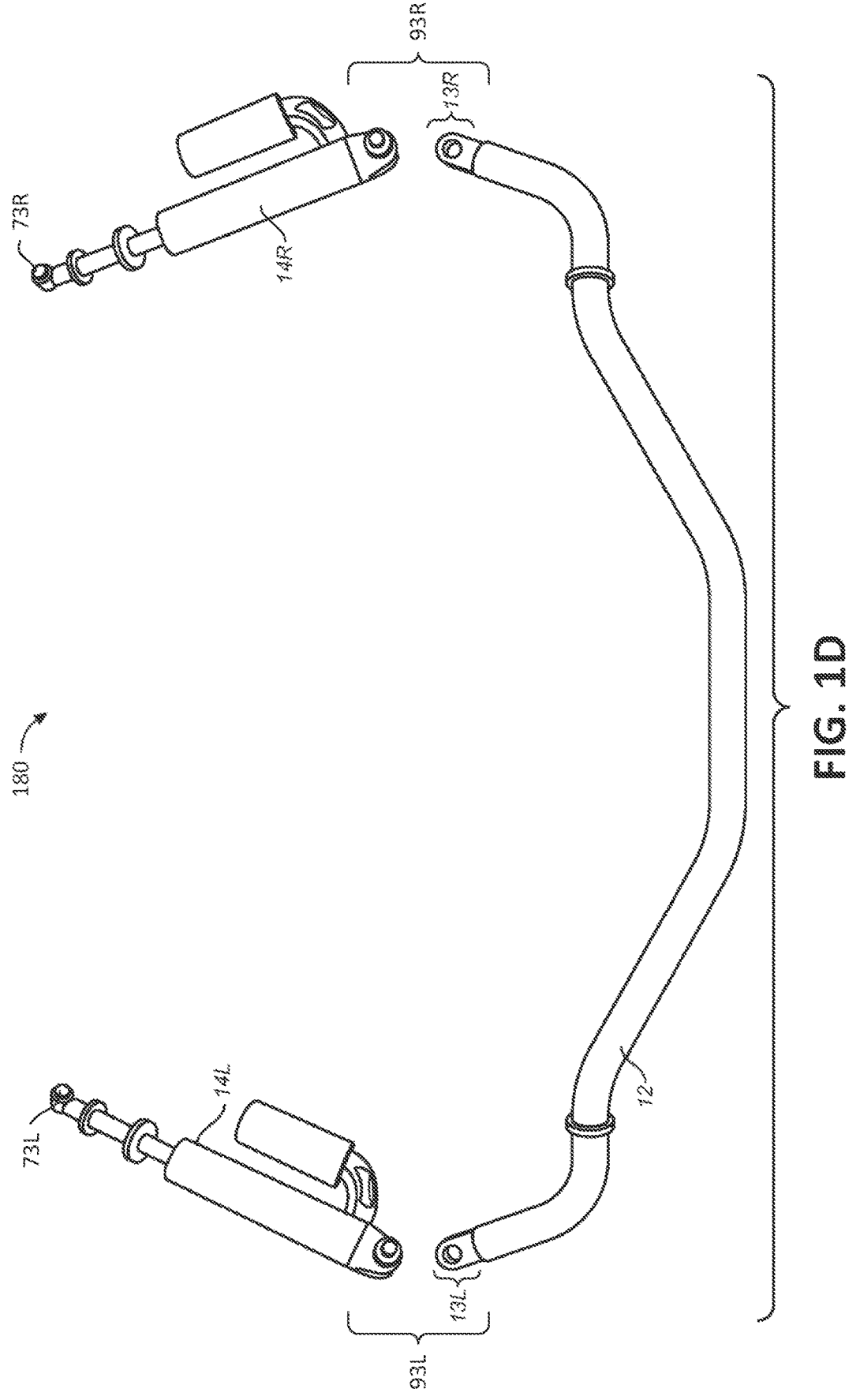
FIG. 1D is a perspective view of a sway bar system including a sway bar, two electronically controlled damper links, and two electronically controlled physical disconnects, in accordance with one embodiment.

Referring now to FIG. 1D, a perspective view of a sway bar system 180 including a sway bar 12, two electronically controlled damper links, e.g., electronically controlled damper link 14L and electronically controlled damper link 14R, and two electronically controlled physical disconnects, e.g., electronically controlled physical disconnect 93R and electronically controlled physical disconnect 93L, are shown in accordance with one embodiment. Although two electronically controlled physical disconnects are shown in FIG. 1D, it is appreciated that in another embodiment, sway bar 12 would have only a single electronically controlled physical disconnect, or a plurality of electronically controlled physical disconnect. Further, although two electronically controlled damper links are shown in FIG. 1D, it is appreciated that in another embodiment, sway bar 12 would have no electronically controlled damper links, one electronically controlled damper link, or a plurality of electronically controlled damper links.

For purposes of clarity, in FIG. 1D, electronically controlled damper link 14L and electronically controlled damper link 14R are shown slightly separated from sway bar 12 in order to more clearly depict the location of electronically controlled physical disconnect 93L, where electronically controlled damper link 14L would, in one embodiment, be physically coupled with, or physically disconnected from, sway bar 12 at connection 13L, and to more clearly depict the location of electronically controlled physical disconnect 93R, where electronically controlled damper link 14R would, in one embodiment, be physically coupled with, or physically disconnected from, sway bar 12 at connection 13R.

In one embodiments of sway bar system 180, electronically controlled physical disconnect 93L includes a linear actuator, rotary actuator, or other electronically controllable coupling feature (similar in functionality to the solenoid valve operation disclosed in remotely controllable active valve), to allow electronically controlled damper link 14L to be physically coupled with and physically disconnected from, sway bar 12 at connection 13L. Similarly, in one embodiments of sway bar system 180, electronically controlled physical disconnect 93R includes a linear actuator, rotary actuator, or other electronically controllable coupling feature (similar in functionality to the solenoid valve operation disclosed in remotely controllable active valve), to allow electronically controlled damper link 14R to be physically coupled with and physically disconnected from, sway bar 12 at connection 13R. It should be noted that in one embodiment, sway bar system 180 is not limited solely to the use of a bushing for electronically controlled physical disconnect 93L or electronically controlled physical disconnect 93R.

With reference still to FIG. 1D, in one embodiment of sway bar system 180, a portion of electronically controlled damper link 14L includes an eyelet 73L, or similar coupling feature, to readily enable coupling of electronically controlled damper link 14L to a location on a vehicle. Similarly, in one embodiment of sway bar system 180, a portion of electronically controlled damper link 14R includes an eyelet 73R, or similar coupling feature, to readily enable coupling of electronically controlled damper link 14R to a location on a vehicle. It should be noted one embodiment of sway bar system 180 uses a connection other than an eyelet for coupling one or both of electronically controlled damper link 14L and electronically controlled damper link 14R to a vehicle.

In one embodiment, the electronically controlled physical disconnect 93L (or electronically controlled physical disconnect 93R) is a portion of electronically controlled damper link 14L (or electronically controlled damper link 14R, respectively).

In one embodiment, electronically controlled physical disconnect 93L (or electronically controlled physical disconnect 93R) is a portion of electronically controlled damper link 14L (or electronically controlled damper link 14R, respectively) located at an opposite end of the eyelet 73L (or eyelet 73R, respectively) portion of electronically controlled damper link 14L (or electronically controlled damper link 14R, respectively).

Although, in one embodiment, sway bar system 180 is disclosed as having two electronically controlled damper links and two electronically controlled physical disconnects, it should be appreciated that other embodiments of sway bar system 180 would include a different number of electronically controlled damper links and/or electronically controlled physical disconnects, such as a single electronically controlled physical disconnect, or a plurality of electronically controlled physical disconnect, no electronically controlled damper links, one electronically controlled damper link, or a plurality of electronically controlled damper links, and the combinations therefrom as discussed in some of the examples below. Further, it should be understood that the following embodiments are provided for clarity, and are not meant to be exhaustive. Instead, one or more embodiments could include other configurations, additional electronically controlled damper links and/or electronically controlled physical disconnects which may be located at different locations along sway bar 12, and the like.

For example, in one embodiment, sway bar system 180 includes only a single electronically controlled damper link (e.g., electronically controlled damper link 14L or electronically controlled damper link 14R), and both of electronically controlled physical disconnect 93R and electronically controlled physical disconnect 93L. In one example of such an embodiment, electronically controlled damper link 14L is used at one end of sway bar 12 such as to couple with connection 13L, and a conventional end link (or the like) is coupled to the other connection 13R. Hence, sway bar system 180 is well suited to embodiments in which one end of sway bar 12 has an electronically controlled damper link (e.g., electronically controlled damper link 14L or electronically controlled damper link 14R) coupled thereto, and also to embodiments in which both ends of sway bar 12 have an electronically controlled damper link (e.g., electronically controlled damper link 14L and electronically controlled damper link 14R) coupled thereto.

In one embodiment, sway bar system 180 includes only a single electronically controlled damper link (e.g., electronically controlled damper link 14L or electronically controlled damper link 14R), and only a single electronically controlled physical disconnect (e.g., electronically controlled physical disconnect 93R or electronically controlled physical disconnect 93L). In one example of such an embodiment, electronically controlled damper link 14L is used at one end of sway bar 12 such as to couple with connection 13L via electronically controlled physical disconnect 93L, and a conventional end link (or the like) is coupled to the other connection 13R without an electronically controlled physical disconnect 93R.

In another embodiment, electronically controlled damper link 14L is used at one end of sway bar 12 such as to couple with connection 13L without an electronically controlled physical disconnect 93L, and a conventional end link (or the like) is coupled to the other connection 13R having electronically controlled physical disconnect 93R.

In one embodiment, sway bar system 180 includes both electronically controlled damper link 14L and electronically controlled damper link 14R, and only a single electronically controlled physical disconnect (e.g., electronically controlled physical disconnect 93R or electronically controlled physical disconnect 93L). In one example of such an embodiment, electronically controlled damper link 14L is used at one end of sway bar 12 such as to couple with connection 13L via electronically controlled physical disconnect 93L, and electronically controlled damper link 14R is coupled to the other connection 13R without an electronically controlled physical disconnect 93R.

In another example of such an embodiment, electronically controlled damper link 14L is used at one end of sway bar 12 such as to couple with connection 13L via without an electronically controlled physical disconnect 93L, and electronically controlled damper link 14R is coupled to the other connection 13R via electronically controlled physical disconnect 93R.

As such, sway bar system 180 is well suited to embodiments in which one or both ends of sway bar 12 have an electronically controlled damper links coupled thereto, and also to embodiments in which one or both ends of sway bar 12 are coupled to one or more electronically controlled damper links (and/or a conventional end link) via one or both of electronically controlled physical disconnects.

For purposes of conciseness and clarity, portions of the following description may refer to the electronically controlled physical disconnect as "electronically controlled physical disconnect 93", instead repeating the same description for each of electronically controlled physical disconnect 93L and electronically controlled physical disconnect 93R. It should be noted that such portions of the description are applicable to either electronically controlled physical disconnect 93L or electronically controlled physical disconnect 93R, as shown in sway bar system 180 of FIG. 1D. Further, the description will pertain to embodiments in which one or both ends of sway bar 12 have electronically controlled physical disconnects coupled therewith, and also to embodiments in which one or both ends of sway bar 12 are coupled to one or more electronically controlled damper links (and/or a conventional end link) via one or both of electronically controlled physical disconnects.

Figure 2:
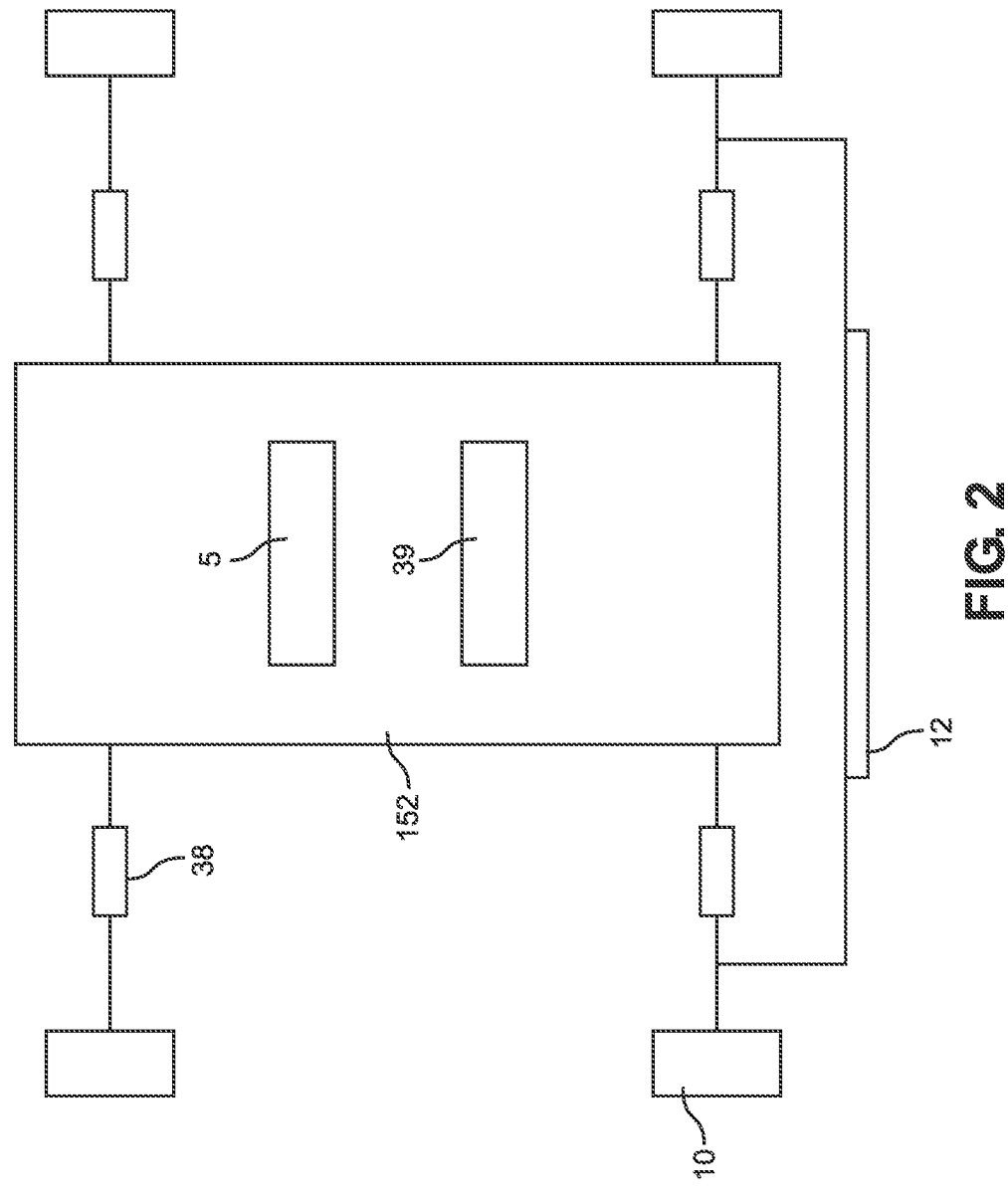
FIG. 2 is a top down drawing of a vehicle.

FIG. 2 is a top down drawing of a vehicle. Also included are vehicle 152, sensors 5, sway bar 12, wheels 10, controller 39, and active valve damper 38 (which may also be referred to as suspension, suspension damper, etc.).

In one embodiment, vehicle 152 includes one or more sensors, smart components, or the like for sensing changes of terrain, vehicle 152 pitch, roll, yaw, speed, acceleration, deceleration, or the like. For the sake of clarity, the term sensor 5 will be used to refer to one or more sensors, smart components, or the like for sensing changes of terrain, vehicle 152 pitch, roll, yaw, speed, acceleration, deceleration, or the like.

In one embodiment, the angular orientation of the sensor 5 is movable through a given range, thereby allowing alteration of a force component sensed by the sensor 5 in relation to a force (vector) input. In one embodiment, the value for the range is approximately 120°. In one embodiment, the value for the range is approximately 100°. It is understood that sensor 5 can be moved or mounted in any suitable configuration and allowing for any suitable range of adjustment as may be desirable. That is useful for adjusting the sensitivity of sensor 5 to various anticipated terrain and vehicle speed conditions (e.g., the vehicle speed affects the vector magnitude of a force input to the vehicle wheel for constant amplitude terrain disparity or "bump/dip." Varying size bumps and dips also affect the vector input angle to the wheel for constant vehicle speed).

Sensor 5 may be any suitable force or acceleration transducer (e.g. strain gage, wheatstone bridge, accelerometer, hydraulic, interferometer based, optical, thermal or any suitable combination thereof). One or more sensors may utilize solid state electronics, electro-mechanical principles or MEMS, or any other suitable mechanisms.

One or more sensor(s) may be attached to an axel, chassis, body, or to any other portion or portions of vehicle 152 as may be useful. In one embodiment, a sensor is fixed to an unsprung portion of the vehicle 152, such as. In one embodiment, the sensor is fixed to a sprung portion of the vehicle 152. In general, one or more sensors may be integrated with the vehicle structure, suspension components, suspension component controller(s) and data processing system as described in U.S. Pat. Nos. 7,484,603; 8,838,335; 8,955,653; 9,303,712; 10,060,499; 10,443,671; and 10,737,546; each of which is herein incorporated, in its entirety, by reference. Sensors and valve actuators (e.g. electric solenoid or linear motor type—note that a rotary motor may also be used with a rotary actuated valve) may be integrated herein utilizing principles outlined in SP-861-Vehicle Dynamics and Electronic Controlled Suspensions SAE Technical Paper Series no. 910661 by Shiozaki et. al. for the International Congress and Exposition, Detroit, Mich., Feb. 25-Mar. 1, 1991 which paper is incorporated herein, in its entirety, by reference. Further, sensors and valves, or principles, of patents and other documents incorporated herein by reference, may be integrated one or more embodiments hereof, individually or in combination, as disclosed herein.

Some or all of components of embodiments herein including sensors, switches, controllers, valves, and the like may be interconnected or connected by wire, wireless, NFC, WAN, LAN, Bluetooth, WiFi, ANT, GARMIN® low power usage protocol, or any suitable power or signal transmitting mechanism.

In general, one or more sensors (e.g., sensor 5) are used for sensing characteristics (or changes to characteristics) such as terrain, environment, temperature, vehicle speed, vehicle pitch, vehicle roll, vehicle yaw, component activity, or the like. It is understood that the one or more sensors may be imbedded, moved, mounted, or the like, in any suitable configuration and allowing for any suitable range of adjustment as may be desirable. Although a single sensor is shown in FIG. 2, it should be appreciated that there may be number of sensors or more than two sensors in operation.

The sensor(s) may be any suitable force or acceleration transducer (e.g. strain gage, Wheatstone bridge, accelerometer, hydraulic, interferometer based, optical, thermal or any suitable combination thereof). The sensor(s) may utilize solid state electronics, electro-mechanical principles or MEMS, or any other suitable mechanisms.

In one embodiment, the one or more of the sensors are a single axis accelerometer, a triaxial accelerometer, a measurement type sensor such as an infrared based time of flight sensor, a radar, 2D and 3D imager, ultrasonic sensor, photoelectric sensor, LiDar, and the like. In one embodiment, the measurement type sensor is a STMicroelectronics sensor and specifically STMicroelectronics sensor model VL53L0X.

In general, a measurement sensor is used to measure distances by projecting a laser light (or sound, etc.) and measuring the reflection. Differences in return times and wavelengths are used to provide distance measurement information. For example, the time of flight sensor mounted on the vehicle is used to measure the distance to the ground in front of the vehicle. In so doing, the time of flight sensor will provide distance data that is used to monitor and detect terrain changes.

In one embodiment, the measurement type sensor continuously and/or repeatedly measures a distance from the sensor to the ground. By monitoring the distance from the sensor to the ground, the measurement type sensor can determine the existence of an upcoming obstacle (e.g., height changes due to holes, bumps, or other obstacles), a shape or abruptness of the obstacle, etc.

For example, in one embodiment, the sensor could be aimed at a point that is approximately 2 feet in front of the vehicle. In general, by repeatedly measuring the distance from the sensor to the ground in front of the vehicle, any changes in that distance are indicative of an upcoming obstacle.

Although a distance of 2 feet is used in one embodiment, in another embodiment, the distance to the point in front of the vehicle varies depending upon speed, terrain, and the like. For example, in one embodiment, the distance in front of the vehicle is defined by user option, factory guidance provided by the damper manufacturer, sensor manufacturer, vehicle manufacturer, damping system controller manufacturer, or the like.

In operation on a steady surface, the sensor will regularly obtain a time-of-flight of x (plus or minus some nominal value depending upon the type of surface, type of vehicle, the precision/tolerance of the sensor, user or system defined tolerance, or the like). For example, in one embodiment, if a vehicle with a very tight suspension setup (such as a road bike), is being ridden on a paved road, the nominal value would be slight (e.g., less than a ¼") such that a change in measurement (e.g., a ½" deep pothole) would be larger than the nominal value. In contrast, in one embodiment, if a bike with a suspension setup that is not as tight as the road bike (such as a gravel bike) is being ridden on the road, the nominal value could be larger (e.g., less than 1") such that the change in measurement (e.g., a ½" deep pothole) would not be larger than the nominal value. Furthermore, in one embodiment, if a bike with a longer suspension setup (such as a mountain bike) is being ridden on the road, the nominal value could be even larger (e.g., less than 3") such that the change in measurement (e.g., a 2" deep pothole) would not be larger than the nominal value.

When the sensor obtains a time-of-flight of x+n (where n is a value that is larger than the nominal value) it would mean that a depression (or hole) is detected. Moreover, the size of n would provide information about the depth of the depression, the size of the depression, the geometry (e.g., angle or grade) of the depression, etc.

In contrast, when the sensor obtains a time of flight of x-n, a bump (or rise) is detected. Here, the size of n would provide information about the height of the rise, the size of the rise, the geometry of the rise, etc.

In one embodiment, the n value is preset for the type of active suspension, the terrain type, the vehicle type, the ride type, or the like.

In one embodiment, controller 39 is an active valve controller, a vehicle controller, a suspension component controller, a damping system controller, a sway bar controller, etc.

In one embodiment, the sensors of vehicle 152 provide the obtained sensor data to a controller 39 which uses the sensor data to monitor the terrain and make suspension or sway bar adjustments. In one embodiment, controller 39 makes suspension adjustments to active valve damper 38, electrically controlled damper links 14, electrically controlled physical disconnect 93, or the like. In one embodiment, controller 39 uses the sensor information to recognize when vehicle 152 is climbing, traversing, or descending.

In one embodiment, controller 39 monitors the terrain at a rate of a thousand times per second and make suspension adjustments in a matter of milliseconds. For example, in one embodiment, sensors on the fork, rear axle, and/or frame read bump input at the wheel and the pitch angle of the vehicle 152, and sends the obtained sensor data to controller 39 at a rate, such as but not limited to, 1,000 times per second. Thus, by placing sensors on the frame and/or proximate both wheels, the controller 39 processes data from the terrain to constantly adjust the suspension for maximum efficiency and control. In one embodiment, the controller 39 includes a lithium ion battery as the main user interface and can be charged (e.g., via micro USB) on or off the vehicle 152.

For example, in one embodiment, the time of flight sensor detects a depression in the terrain. The depression data generated by the time of flight sensor is provided to the controller 39 which will then compare the measurement data against the nominal value and generate a command to one or more of the active valves to change to the damping setting of one or more dampers when the nominal value is exceeded. For example, a compression damping setting would be softened, a rebound damping speed setting would be increased, etc. Similarly, a command can be generated for one or more of the active valves to change to the settings of sway bar 12.

In one embodiment, after detecting the depression, the time of flight sensor detects an upcoming rise in the terrain (e.g., the other side of the depression) and then makes a number of consistent measurements indicating a (relatively) smooth surface. In one embodiment, the rise in the terrain and the return to a constant distance measurement data generated by the time of flight sensor is provided to the controller 39. When the controller 39 determines that the obstacle has been passed, in one embodiment, it will generate the command to the active valve to change to the damping setting of the one or more dampers back to the pre-obstacle compression and/or rebound settings. For example, the compression damping setting would be stiffened, the rebound speed setting would be decreased, etc. Similarly, a command can be generated for one or more of the active valves to restore the pre-obstacle settings of sway bar 12.

In one embodiment, a measurement type sensor continuously and/or repeatedly measures a distance from a fixed point of vehicle 152 to the lower stanchion, wheel, fender, ground, or other fixed point. By monitoring the distance between these points, the measurement type sensor can determine the suspension travel used and the speed at which the vehicle 152 suspension compressed and rebounded.

In one embodiment, sensor 5 is a measurement type sensor such as an infrared based time of flight sensor and the like. In one embodiment, the measurement type sensor continuously and/or repeatedly measures a distance from the from the bottom shock eyelet, supporting shock substructure, or other fixed point to the top shock eyelet, supporting substructure, or other fixed point. By monitoring the distance between these points, the measurement type sensor can determine the shock suspension travel used and the speed at which the shock suspension compressed and rebounded.

It should be appreciated that a sensor on a second vehicle (or any number of linked vehicles) could be providing information to the first vehicle (e.g., vehicle 152). For example, if two riders are riding two vehicles within a certain range, the sensors on both vehicles could be communicating wirelessly such that the information from the sensors on the lead vehicle is also provided to the follow vehicle(s) (or automobiles, motorcycles, ATVs, snowmobiles, water vehicles, trailers, and the like). In so doing, the information from the lead vehicle sensor can be used to provide the follow vehicle(s) with proper damper assembly settings.

In one embodiment, the sensors 5 provide the obtained sensor data to a suspension controller 39 which processes data from the terrain to constantly adjust the suspension for maximum efficiency and control. In one embodiment, using the sensor's pitch detection, climbing, traversing or descending of vehicle 152 can be detected.

In one embodiment, one or a plurality of component(s) of the vehicle 152 are also smart component(s). Examples of the smart component(s) can include one or more of the wheels, rear shocks, front shocks, sway bar, and the like. In one embodiment, the smart component(s) will include connective features that allow them to communicate wired or wirelessly with a controller, mobile device, one or more sensors, and/or any other smart component(s) within transmission range (thereby becoming connected components). In one embodiment, the sensors, smart components, smart devices, controllers, valves, and the like may be interconnected or connected by (one or a combination of) wire, or wirelessly via systems such as near field communication (NFC), WAN, LAN, Bluetooth, WiFi, ANT, GARMIN® low power usage protocol, or any suitable power or signal transmitting mechanism, making them connected components.

By using a connected component, data (including real-time data) can be collected from the smart component by the controller 39. Depending upon the connected component, data such as telemetry attributes to provide angle, orientation, velocity, acceleration, RPM, operating temperature, and the like, can be obtained.

For example, a smart wheel would be a connected component that is attached to the wheel (or wheels) to provide telemetry such as RPM, tire pressure, tire temperature, or the like to the controller 39. For example, the smart component could be a smart valve stem, a MEMS device, or the like coupled with the rim of the wheel.

Figure 3:
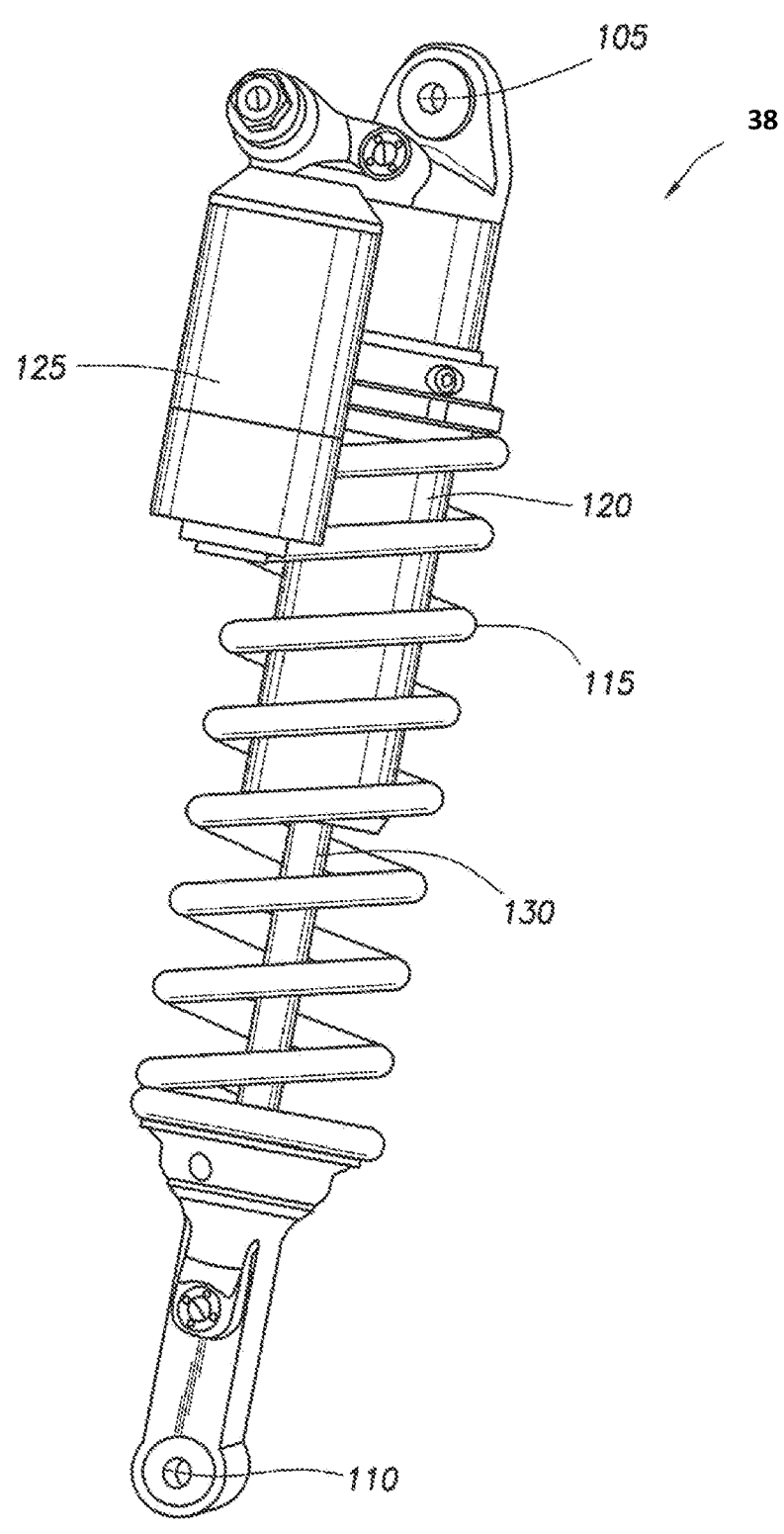
FIG. 3 is a perspective view of a rear damping assembly including a damper, external reservoir, and helical spring, in accordance with an embodiment.

FIG. 3 is a perspective view of an active valve damper 38. In one embodiment, active valve damper 38 includes eyelets 105 and 110, damper housing 120, helical spring 115, piston shaft 130, and piggyback (or external reservoir 125). In one embodiment, external reservoir 125 is described in U.S. Pat. No. 7,374,028 the content of which is entirely incorporated herein by reference.

In one embodiment, the damper housing 120 includes a piston and chamber and the external reservoir 125 includes a floating piston and pressurized gas to compensate for a reduction in volume in the main damper chamber of the damping assembly 38 as the piston shaft 130 moves into the damper body. Fluid communication between the main chamber of the damper and the external reservoir 125 may be via a flow channel including an adjustable needle valve. In its basic form, the damper works in conjunction with the helical spring and controls the speed of movement of the piston shaft by metering incompressible fluid from one side of the damper piston to the other, and additionally from the main chamber to the reservoir, during a compression stroke (and in reverse during the rebound or extension stroke).

Although a coil sprung damping assembly is shown in FIG. 3, this is provided as one embodiment and for purposes of clarity. In one embodiment, the active valve damper 38 could be a different type such as, but not limited to, an air sprung fluid damper assembly, a stand-alone fluid damper assembly, and the like.

Example Active Valve

Figure 4:
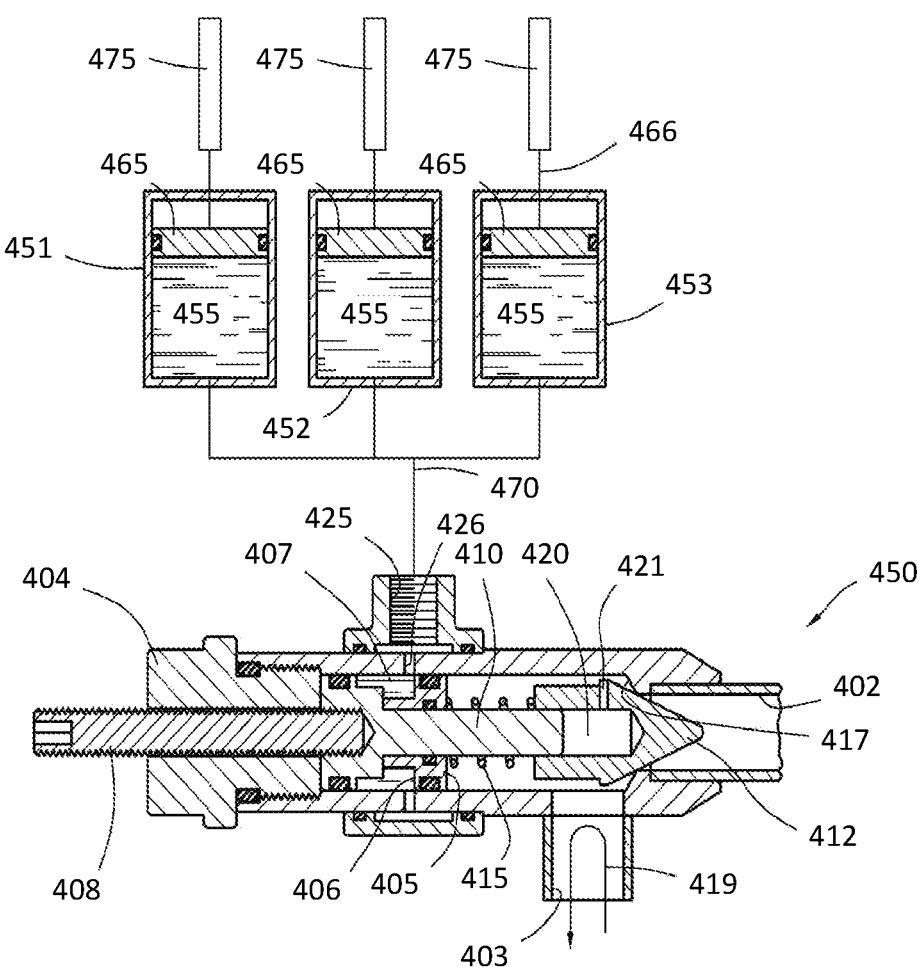
FIG. 4 is an enlarged section view showing an active valve and a plurality of valve operating cylinders in selective communication with an annular piston surface of the active valve, in accordance with an embodiment.

Referring now to FIG. 4, an enlarged view of an active valve 450 is shown in accordance with an embodiment. Although FIG. 4 shows the active valve 450 in a closed position (e.g. during a rebound stroke of the damper), the following discussion also includes the opening of active valve 450. Active valve 450 includes a valve body 404 housing a movable piston 405 which is sealed within the body. The piston 405 includes a sealed chamber 407 adjacent an annular piston surface 406 at a first end thereof. The chamber 407 and annular piston surface 406 are in fluid communication with a port 425 accessed via opening 426. Two additional fluid communication points are provided in the body including orifice 402 and orifice 403 for fluid passing through the active valve 450.

Extending from a first end of the piston 405 is a shaft 410 having a cone shaped member 412 (other shapes such as spherical or flat, with corresponding seats, will also work suitably well) disposed on an end thereof. The cone shaped member 412 is telescopically mounted relative to, and movable on, the shaft 410 and is biased toward an extended position due to a spring 415 coaxially mounted on the shaft 410 between the cone shaped member 412 and the piston 405. Due to the spring biasing, the cone shaped member 412 normally seats itself against a seat 417 formed in an interior of the valve body 404.

As shown, the cone shaped member 412 is seated against seat 417 due to the force of the spring 415 and absent an opposite force from fluid entering the active valve 450 along orifice 402. As cone shaped member 412 telescopes out, a gap 420 is formed between the end of the shaft 410 and an interior of cone shaped member 412. A vent 421 is provided to relieve any pressure formed in the gap. With a fluid path through the active valve 450 (from 403 to 402) closed, fluid communication is substantially shut off from the rebound side of the cylinder into the valve body (and hence to the compression side) and its "dead-end" path is shown by arrow 419.

In one embodiment, there is a manual pre-load adjustment on the spring 415 permitting a user to hand-load or un-load the spring using a threaded member 408 that transmits motion of the piston 405 towards and away from the conical member, thereby changing the compression on the spring 415.

Also shown in FIG. 4 is a plurality of valve operating cylinders 451, 452, 453. In one embodiment, the cylinders each include a predetermined volume of fluid 455 that is selectively movable in and out of each cylindrical body through the action of a separate corresponding piston 465 and rod 466 for each cylindrical body. A fluid path 470 runs between each cylinder and port 425 of the valve body where annular piston surface 406 is exposed to the fluid.

Because each cylinder has a specific volume of substantially incompressible fluid and because the volume of the sealed chamber 407 adjacent the annular piston surface 406 is known, the fluid contents of each cylinder can be used, individually, sequentially or simultaneously to move the piston a specific distance, thereby effecting the damping characteristics of the system in a relatively predetermined and precise way.

While the cylinders 451-453 can be operated in any fashion, in the embodiment shown each piston 465 and rod 466 is individually operated by a solenoid 475 and each solenoid, in turn, is operable from a remote location of the vehicle, like a cab of a motor vehicle or even the handlebar area of a motor or bicycle (not shown). Electrical power to the solenoids 475 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 450 is in the damping-open position, fluid flow through orifice 402 provides adequate force on the cone shaped member 412 to urge it backwards, at least partially loading the spring 415 and creating a fluid flow path from the orifice 402 into and through orifice 403.

The characteristics of the spring 415 are typically chosen to permit active valve 450 to open at a predetermined pressure, with a predetermined amount of control pressure applied to port 425. For a given spring 415, higher control pressure at port 425 will result in higher pressure required to open the active valve 450 and correspondingly higher damping resistance in orifice 402. In one embodiment, the control pressure at port 425 is raised high enough to effectively "lock" the active valve closed resulting in a substantially rigid compression damper (particularly true when a solid damping piston is also used).

In one embodiment, the valve is open in both directions when the cone shaped member 412 is "topped out" against valve body 404. In another embodiment however, when the valve piston 405 is abutted or "topped out" against valve body 404 the spring 415 and relative dimensions of the active valve 450 still allow for the cone shaped member 412 to engage the valve seat 417 thereby closing the valve. In such embodiment backflow from the rebound side to the compression side is always substantially closed and cracking pressure from flow along orifice 402 is determined by the pre-compression in the spring 415. In such embodiment, additional fluid pressure may be added to the inlet through port 425 to increase the cracking pressure for flow along orifice 402 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 450 can be remotely-operated and can be used in a variety of ways with many different driving and road variables and/or utilized at any point during use of a vehicle. In one example, active valve 450 is controlled based upon vehicle speed in conjunction with the angular location of the vehicle's steering wheel. In this manner, by sensing the steering wheel turn severity (angle of rotation and rotational velocity), additional damping (by adjusting the corresponding size of the opening of orifice 402 by causing cone shaped member 412 to open, close, or partially close orifice 402) can be applied to one shock absorber or one set of vehicle shock absorbers on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 450 (and corresponding change to the working size of the opening of orifice 402 by causing cone shaped member 412 to open, close, or partially close orifice 402) in response thereto. In another example, active valve 450 is controlled at least in part by a pressure transducer measuring pressure in a vehicle tire and adding damping characteristics to some or all of the wheels (by adjusting the working size of the opening of orifice 402 by causing cone shaped member 412 to open, close, or partially close orifice 402) in the event of, for example, an increased or decreased pressure reading.

In one embodiment, active valve 450 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition and adds and/or reduces damping to some or all of the vehicle's dampers (by adjusting the working size of the opening of orifice 402 by causing cone shaped member 412 to open, close, or partially close orifice 402 chambers) in the event of a loss of control to help the operator of the vehicle to regain control.

For example, active valve 450, when open, permits a first flow rate of the working fluid through orifice 402. In contrast, when active valve 450 is partially closed, a second flow rate of the working fluid though orifice 402 occurs. The second flow rate is less than the first flow rate but greater than no flow rate. When active valve 450 is completely closed, the flow rate of the working fluid though orifice 402 is statistically zero.

In one embodiment, instead of (or in addition to) restricting the flow through orifice 402, active valve 450 can vary a flow rate through an inlet or outlet passage within the active valve 450, itself. See, as an example, the electronic valve of FIGS. 2-4 of U.S. Pat. No. 9,353,818 which is incorporated by reference herein, in its entirety, as further example of different types of "electronic" or "active" valves). Thus, the active valve 450, can be used to meter the working fluid flow (e.g., control the rate of working fluid flow) with/or without adjusting the flow rate through orifice 402.

Due to the active valve 450 arrangement, a relatively small solenoid (using relatively low amounts of power) can generate relatively large damping forces. Furthermore, due to incompressible fluid inside the active valve damper 38, damping occurs as the distance between cone shaped member 412 and orifice 402 is reduced. The result is a controllable damping rate. Certain active valve features are described and shown in U.S. Pat. Nos. 8,627,932; 8,857,580; 9,033,122; 9,120,362; and 9,239,090 which are incorporated herein, in their entirety, by reference.

It should be appreciated that when the body 404 rotates in a reverse direction than that described above and herein, the cone shaped member 412 moves away from orifice 402 providing at least a partially opened fluid path.

Figure 5:
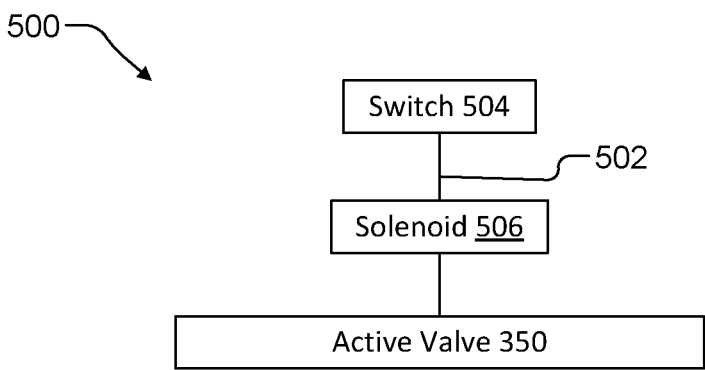
FIG. 5 is a schematic diagram showing a control arrangement for an active valve, in accordance with an embodiment.

FIG. 5 is a schematic diagram showing a control arrangement 500 for a remotely-operated active valve 450. As illustrated, a signal line 502 runs from a switch 504 to a solenoid 506. Thereafter, the solenoid 506 converts electrical energy into mechanical movement and rotates body 404 within active valve 450, In one embodiment, the rotation of body 404 causes an indexing ring consisting of two opposing, outwardly spring-biased balls to rotate among indentions formed on an inside diameter of a lock ring.

As the body 404 rotates, cone shaped member 412 at an opposite end of the valve is advanced or withdrawn from an opening in orifice 402. For example, the body 404 is rotationally engaged with the cone shaped member 412. A male hex member extends from an end of the body 404 into a female hex profile bore formed in the cone shaped member 412. Such engagement transmits rotation from the body 404 to the cone shaped member 412 while allowing axial displacement of the cone shaped member 412 relative to the body 404. Therefore, while the body does not axially move upon rotation, the threaded cone shaped member 412 interacts with mating threads formed on an inside diameter of the bore to transmit axial motion, resulting from rotation and based on the pitch of the threads, of the cone shaped member 412 towards or away from an orifice 402, between a closed position, a partially open position, and a fully or completely open position.

Adjusting the opening of orifice 402 modifies the flowrate of the fluid through active valve 450 thereby varying the stiffness of a corresponding active valve damper 38. While FIG. 5 is simplified and involves control of a single active valve 450, it will be understood that any number of active valves corresponding to any number of fluid channels (e.g., bypass channels, external reservoir channels, bottom out channels, etc.) for a corresponding number of vehicle suspension dampers could be used alone or in combination. That is, one or more active valves could be operated simultaneously or separately depending upon needs in a vehicular suspension system.

For example, a suspension damper could have one, a combination of, or each of an active valve(s): for a bottom out control, an internal bypass, for an external bypass, for a fluid conduit to the external reservoir 125, etc. In other words, anywhere there is a fluid flow path within the active valve damper 38, an active valve could be used. Moreover, the active valve could be alone or used in combination with other active valves at other fluid flow paths to automate one or more of the damping performance characteristics of the damping assembly. Moreover, additional switches could permit individual operation of separate active bottom out valves.

Figure 6:
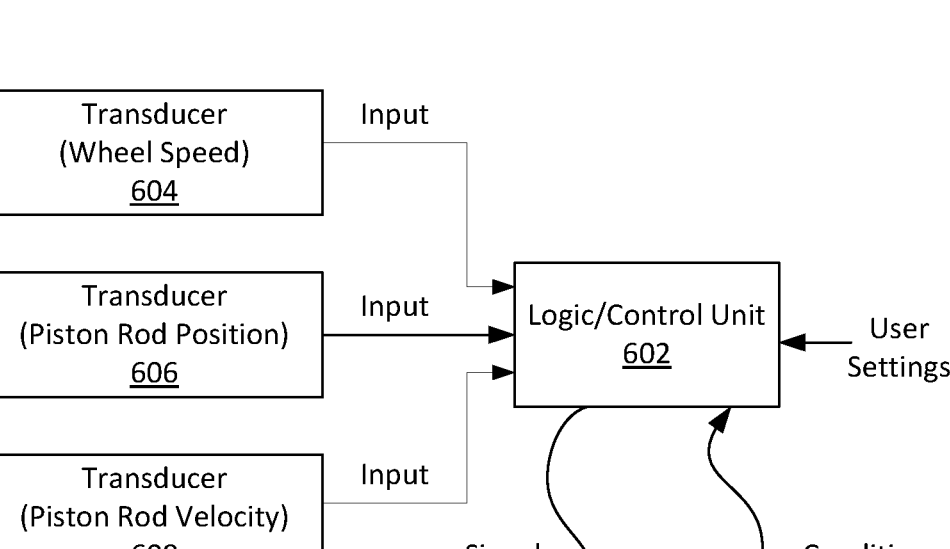
FIG. 6 is a schematic diagram of a control system based upon any or all of vehicle speed, damper rod speed, and damper rod position, in accordance with an embodiment.

In addition to, or in lieu of, the simple, switch-operated remote arrangement of FIG. 5, the remotely-operable active valve 450 can be operated automatically based upon one or more driving conditions, and/or automatically or manually utilized at any point during use of a vehicle. FIG. 6 shows a schematic diagram of a control system 600 based upon any or all of vehicle speed, damper rod speed, and damper rod position. One embodiment of the arrangement of FIG. 6 is designed to automatically increase damping in a shock absorber in the event a damper rod reaches a certain velocity in its travel towards the bottom end of a damper at a predetermined speed of the vehicle.

In one embodiment, the control system 600 adds damping (and control) in the event of rapid operation (e.g. high rod velocity) of the active valve damper 38 to avoid a bottoming out of the damper rod as well as a loss of control that can accompany rapid compression of a shock absorber with a relative long amount of travel. In one embodiment, the control system 600 adds damping (e.g., adjusts the size of the opening of orifice 402 by causing cone shaped member 412 to open, close, or partially close orifice 402) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

While control system 600 is described controlling wheel suspension, it should be understood that this is for the sake of clarity and brevity, and that control system 600 can also affect systems related to sway bar 12. For instance, control system 600 can engage or disengage sway bar 12, change the stiffness of the dampers connected to sway bar 12, etc.

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled with active valve 450 for changing the working size of the opening of orifice 402 by causing cone shaped member 412 to open, close, or partially close orifice 402. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper or other connected suspension element such as the tire, wheel, or axle assembly. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 450 (e.g., the logic unit 602 is an activation signal provider) to cause active valve 450 to move into the desired state (e.g., adjust the flow rate by adjusting the distance between cone shaped member 412 and orifice 402). Thereafter, the condition, state, or position of active valve 450 is relayed back to logic unit 602 via an active valve monitor or the like.

In one embodiment, logic unit 602 shown in FIG. 6 assumes a single active valve 450 corresponding to a single orifice 402 of a single active valve damper 38, but logic unit 602 is usable with any number of active valves or groups of active valves corresponding to any number of orifices, or groups of orifices. For instance, the suspension dampers on one side of the vehicle can be acted upon while the vehicles other suspension dampers remain unaffected.

Figure 7:
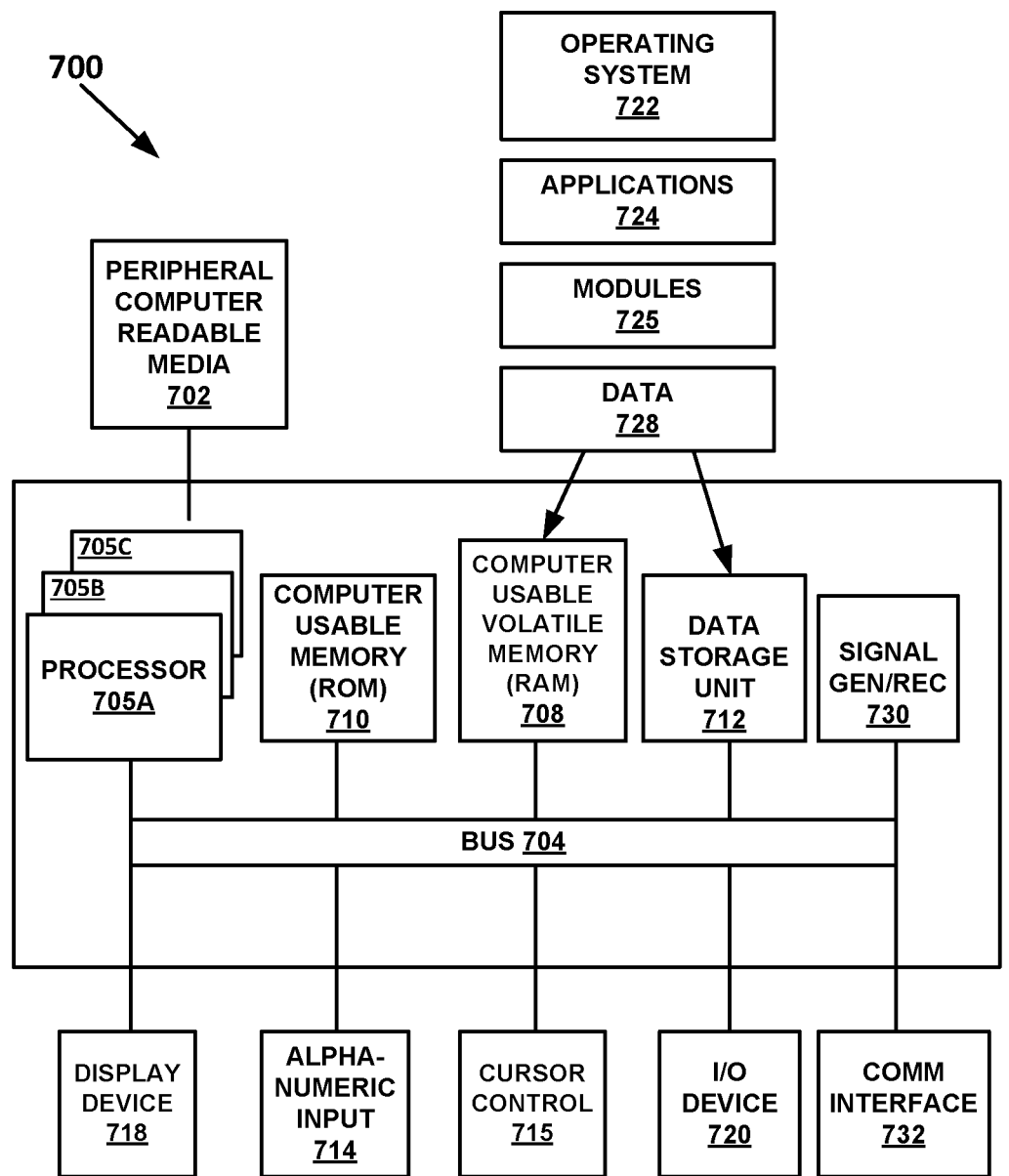
FIG. 7 is a block diagram of an example computer system with which or upon which various embodiments of the present invention may be implemented.

With reference now to FIG. 7, an example computer system 700 is shown. In the following discussion, computer system 700 is representative of a system or components that may be used with aspects of the present technology. In one embodiment, different computing environments will only use some of the components shown in computer system 700.

In general, controller 39 can include some or all of the components of computer system 700. In different embodiments, controller 39 can include communication capabilities (e.g., wired such as ports or the like, and/or wirelessly such as near field communication, Bluetooth, WiFi, or the like) such that some of the components of computer system 700 are found on controller 39 while other components could be ancillary but communicatively coupled thereto (such as a mobile device, tablet, computer system or the like). For example, in one embodiment, controller 39 can be communicatively coupled with one or more different computing systems to allow a user (or manufacturer, tuner, technician, etc.) to adjust or modify any or all of the programming stored in controller 39. In one embodiment, the programming includes computer-readable and computer-executable instructions that reside, for example, in non-transitory computer-readable medium (or storage media, etc.) of controller 39 and/or computer system 700.

In one embodiment, computer system 700 includes an address/data/control bus 704 for communicating information, and a processor 705A coupled with bus 704 for processing information and instructions. As depicted in FIG. 7, computer system 700 is also well suited to a multiprocessor environment in which a plurality of processors 705A, 705B, and 705C are present. Conversely, computer system 700 is also well suited to having a single processor such as, for example, processor 705A. Processors 705A, 705B, and 705C may be any of various types of microprocessors. Computer system 700 also includes data storage features such as a computer usable volatile memory 708, e.g., random access memory (RAM), coupled with bus 704 for storing information and instructions for processors 705A, 705B, and 705C. In one embodiment, computer system 700 can access peripheral computer readable media 702.

Computer system 700 also includes computer usable non-volatile memory 710, e.g., read only memory (ROM), coupled with bus 704 for storing static information and instructions for processors 705A, 705B, and 705C. Also present in computer system 700 is a data storage unit 712 (e.g., a magnetic disk drive, optical disk drive, solid state drive (SSD), and the like) coupled with bus 704 for storing information and instructions. Computer system 700 also can optionally include an alpha-numeric input device 714 including alphanumeric and function keys coupled with bus 704 for communicating information and command selections to processor 705A or processors 705A, 705B, and 705C. Computer system 700 also can optionally include a cursor control device 715 coupled with bus 704 for communicating user input information and command selections to processor 705A or processors 705A, 705B, and 705C. Cursor control device may be a touch sensor, gesture recognition device, and the like. Computer system 700 of the present embodiment can optionally include a display device 718 coupled with bus 704 for displaying information.

Referring still to FIG. 7, display device 718 can be a liquid crystal device, cathode ray tube, OLED, plasma display device or other display device suitable for creating graphic images and alpha-numeric characters recognizable to a user. Cursor control device 715 allows the computer user to dynamically signal the movement of a visible symbol (cursor) on a display screen of display device 718. Many implementations of cursor control device 715 are known in the art including a trackball, mouse, touch pad, joystick, non-contact input, gesture recognition, voice commands, bio recognition, and the like. In addition, special keys on alphanumeric input device 714 capable of signaling movement of a given direction or manner of displacement. Alternatively, it will be appreciated that a cursor can be directed and/or activated via input from alpha-numeric input device 714 using special keys and key sequence commands.

Computer system 700 is also well suited to having a cursor directed by other means such as, for example, voice commands. Computer system 700 also includes an I/O device 720 for coupling computer system 700 with external entities. For example, in one embodiment, I/O device 720 is a modem for enabling wired or wireless communications between computer system 700 and an external network such as, but not limited to, the Internet or intranet. A more detailed discussion of the present technology is found below.

Referring still to FIG. 7, various other components are depicted for computer system 700. Specifically, when present, an operating system 722, applications 724, modules 725, and data 728 are shown as typically residing in one or some combination of computer usable volatile memory 708, e.g. random-access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the Internet. The present technology may be applied to one or more elements of described computer system 700.

Computer system 700 also includes one or more signal generating and receiving device(s) 730 coupled with bus 704 for enabling computer system 700 to interface with other electronic devices and computer systems Signal generating and receiving device(s) 730 of the present embodiment may include wired serial adaptors, modems, and network adaptors, wireless modems, and wireless network adaptors, and other such communication technology. The signal generating and receiving device(s) 730 may work in conjunction with one (or more) communication interface 732 for coupling information to and/or from computer system 700. Communication interface 732 may include a serial port, parallel port, Universal Serial Bus (USB), Ethernet port, Bluetooth, thunderbolt, near field communications port, WiFi, Cellular modem, or other input/output interface. Communication interface 732 may physically, electrically, optically, or wirelessly (e.g., via radio frequency) couple computer system 700 with another device, such as a mobile phone, radio, or computer system.

Figure 8:
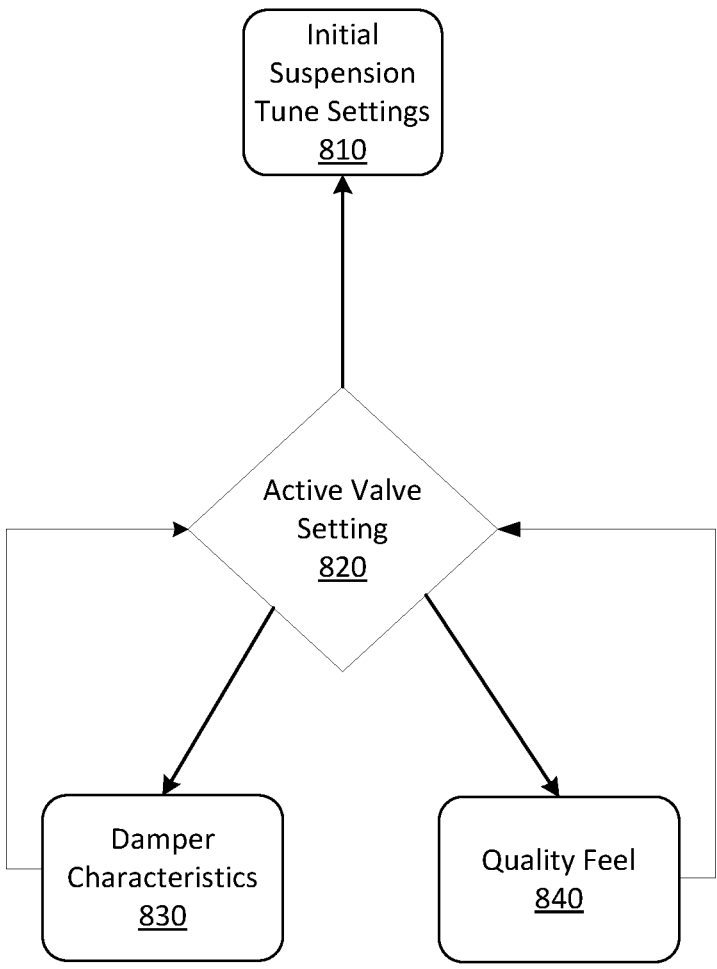
FIG. 8 is a flowchart of an embodiment for an active bottom out valve operation scheme, in accordance with an embodiment.

FIG. 8 is a flowchart 800 of an example method of operational incorporation for an active valve 450 operation in accordance with an embodiment. In one embodiment, during tuning of a suspension, the ride zone portion of the active valve damper 38 has a given range. This range can be adjusted by hardening or softening the active valve damper 38 settings in one or both of compression and rebound.

In one embodiment, by utilizing at least one active valve 450 in active valve damper 38, the tuning of the damping characteristics of the ride zone portion can be electronically vary based on terrain and/or rider behavior, etc. Similarly, electronically controlled damper links 14 and electronically controlled physical disconnects 93 will have a given range, wherein at least one active valve 450 can be utilized to electronically vary the settings based on terrain and/or rider behavior, etc.

At 810, the initial suspension tune setting is established (as discussed in further detail in the tune section herein). At 820, the active valve 450 is checked (as described in detail in FIGS. 5-7) for its present damping characteristic settings and is adjusted as needed.

At 830, the damper characteristics are established for the active tune and the damping of active valve 450 is adjusted accordingly.

At 840, the quality feel is evaluated and the damping of active valve 450 can be adjusted based on the quality feel.

Although a single flowchart is shown, it should be appreciated that the flowchart 800 could be similarly utilized by each of a plurality of active valves within the single active valve damper 38, by every of a plurality of active valves within the single active valve damper 38; by an active valve in each of a plurality of damping assemblies within a vehicle suspension; by a plurality of active valves in a plurality of damping assemblies within a vehicle suspension; by every active valve in a plurality of damping assemblies within a vehicle suspension; and by every active valve in every active valve damper 38 within a vehicle suspension.

Similarly, it should be appreciated that the flowchart 800 could be utilized by each of a plurality of active valves within the electronically controlled damper links 14; by every of a plurality of active valves within electronically controlled damper links 14; by an active valve in each of a plurality of damping assemblies within a sway bar system 100; by a plurality of active valves in a plurality of damping assemblies within a sway bar system 100; by every active valve in a plurality of damping assemblies within a sway bar system 100; and by every active valve in every electronically controlled damper links 14 within a sway bar system 100.

Similarly, it should be appreciated that the flowchart 800 could be utilized by each of a plurality of active valves within the electronically controlled physical disconnects 93; by every of a plurality of active valves within the electronically controlled physical disconnects 93; by an active valve in each of a plurality of damping assemblies within a sway bar system 100; by a plurality of active valves in a plurality of damping assemblies within a sway bar system 100; by every active valve in a plurality of damping assemblies within a sway bar system 100, and by every active valve in every electronically controlled physical disconnects 93 within a sway bar system 100.

Figure 9:
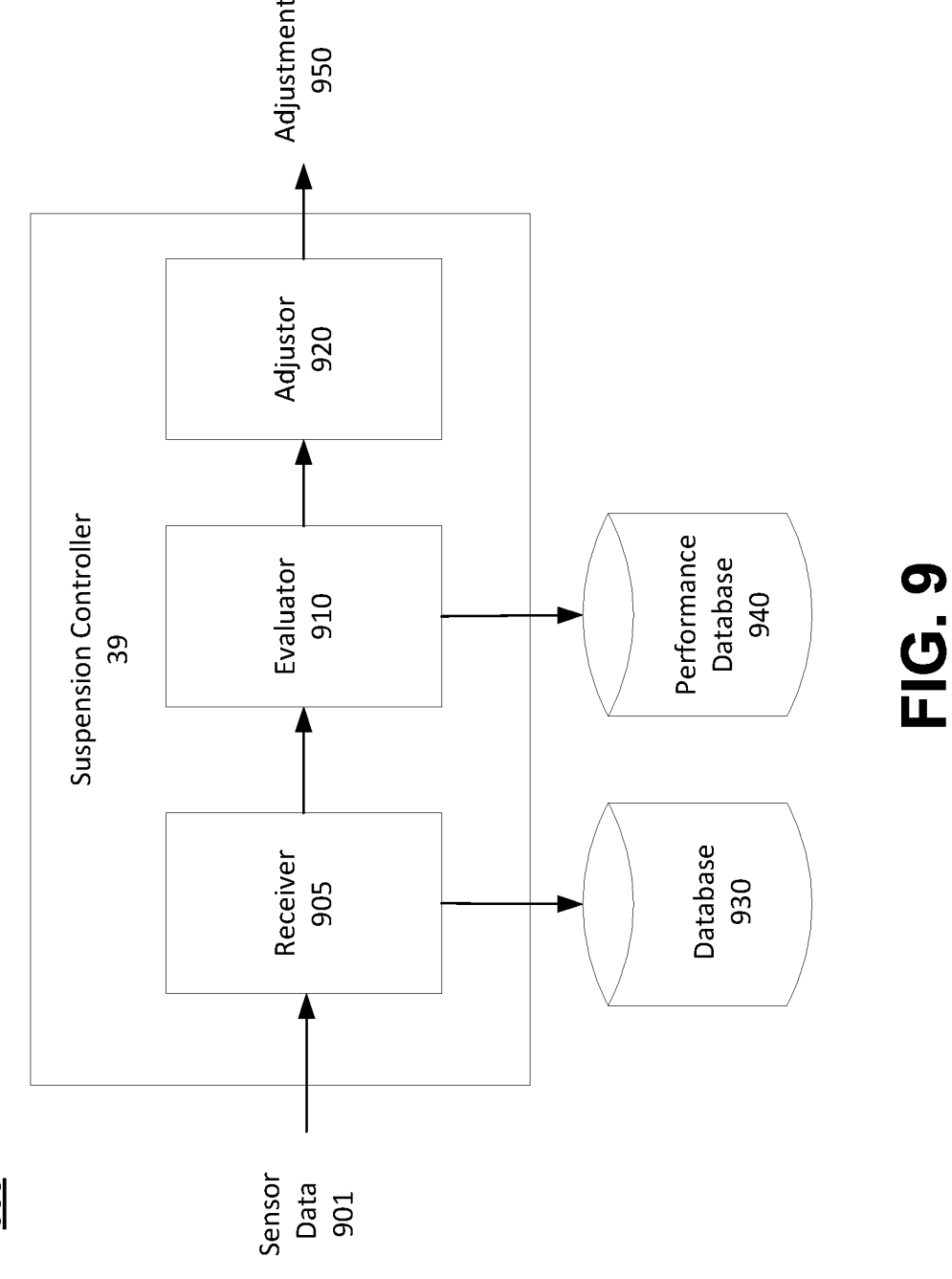
FIG. 9 is a block diagram of a suspension controller system, in accordance with an embodiment.

Referring now to FIG. 9, a block diagram of a controller system 900 is shown in accordance with an embodiment. In one embodiment, controller system 900 includes a control device (e.g., controller 39) and at least one active valve damper and one or more sensors coupled with a vehicle as shown in at least FIG. 2. In one embodiment, controller 39 includes a sensor data receiver 905, a sensor data evaluator 910, and an active valve damper adjustor 920.

In one embodiment, sensor data receiver 905 receives sensor data 901 from the one or more sensors. In one embodiment, sensor data receiver 905 utilizes database 930 (or other memory solution) to collect and store the received sensor data 901.

In one embodiment, sensor data 901 includes sensor data such as accelerometer data, measurement data, and the like. In one embodiment, sensor data 901 is received from a bump sensor attached to one or both of the front and rear wheels that senses the bumps encountered by bicycle 50 (e.g., reading the terrain).

In one embodiment, sensor data 901 is received from a measurement type sensor (such as measurement type sensor 41) that continuously and/or repeatedly measures a distance from the chassis, body, or other fixed point to the lower stanchion, wheel, fender, ground or other fixed point. By monitoring the distance between these points, the measurement type sensor can determine the suspension travel used and the speed at which the vehicle suspension compressed and rebounded.

In one embodiment, sensor data 901 is received from a plurality of sensor types as described herein.

In one embodiment, sensor data evaluator 910 determines a value of a repeating pattern identified in the sensor data, obtains a range of operational values for at least one damping characteristic of the active valve damper related to the repeating pattern, and adjusts the range of operational values based on the repeating pattern value. In one embodiment, the tunes including the operational values for at least one damping characteristic of the active valve damper are stored in performance database 940.

In one embodiment, active valve damper adjustor 920 is configured to monitor and adjust at least one damping characteristic of the at least one active valve damper (e.g., active valve damper 38). That is, active valve damper adjustor 920 will provide adjustment 950 commands to at least one active valve damper (e.g., active valve damper 38).

Evaluation Using Frequency

In one embodiment, the sensor data is evaluated by sensor data evaluator 910 using real-time fast Fourier transform (FFT) to calculate frequency data from the sensor signal for a certain period of time. In one embodiment, performance database 940 will include a number of pre-identified frequency signals that have been previously associated with different types of terrain. For example, a gravel road will have a unique signature (e.g., unique frequency signal).

In one embodiment, sensor data evaluator 910 will access the performance database 940 and correlate (or match, establish a level of similarity (e.g., 50% or greater match), and the like) the calculated frequency data from the sensor signal with one of the pre-identified frequencies signature associated with different types of terrain. For example, sensor data evaluator 910 will calculate the frequency data from the sensor signal and determine that the calculated frequency data reaches the threshold to consider it analogous to the pre-identified frequency signature associated with a gravel road.

In one embodiment, sensor data evaluator 910 will then access performance database 940 to obtain the appropriate damping settings for the gravel road. For example, the appropriate damping settings (e.g., gravel road settings) would include a bump threshold characteristic threshold such that the traveling along the gravel road will not be sufficient to trigger the suspension to open.

In one embodiment, sensor data evaluator 910 will compare the present damping characteristics, thresholds, and settings to determine if they are different from, or already set to, the gravel road settings. If the active valve damper 38 damping characteristics, thresholds, and settings are already set to the gravel road settings then no further actions would be needed.

In one embodiment, if the present active valve damper 38 damping characteristics, thresholds, and settings are not already set to the gravel road settings, sensor data evaluator 910 will provide the gravel road damping characteristics, thresholds, and settings to active valve damper adjustor 920 which will provide the adjustment 950 information to active valve damper 38.

In one embodiment, if the present active valve damper 38 damping characteristics, thresholds, and settings are not already set to the gravel road settings, sensor data evaluator 910 will monitor the input frequency for a certain period of time to determine that the vehicle is remaining on the gravel road and did not just cross a gravel road or encounter only a small patch of gravel road. For example, in one embodiment, the sensor data evaluator 910 would evaluate the calculated frequency data for 1-5 seconds in order to establish that the vehicle is continuing to be operated on a gravel road environment. In one embodiment, the evaluation time period could be much shorter or longer depending upon type of ride (e.g., race, training, fun, etc.), user settings, performance requirements (e.g., less than 3 seconds on a gravel road will not cause a significant change to a rider's performance, but more than 3 seconds will begin a noticeable performance degradation, etc.), and the like.

In one embodiment, if the present active valve damper 38 damping characteristics, thresholds, and settings are not already set to the gravel road settings, after the evaluation time period is achieved, sensor data evaluator 910 will provide the gravel road damping characteristics, thresholds, and settings to active valve damper adjustor 920 which will provide the adjustment 950 information to active valve damper 38.

In one embodiment, sensor data evaluator 910 will continue to calculate frequency data from the sensor signal monitor to determine that the vehicle is remaining on the gravel road. If the input frequency changes to a different signature for a certain period of time sensor data evaluator 910 will repeat the above process to switch the damping characteristics, thresholds, and settings to the appropriate terrain settings. For example, if the sensor data evaluator 910 determines that the vehicle has returned to hard pack (following one or more embodiments above), sensor data evaluator 910 will provide the hard pack damping characteristics, thresholds, and settings to active valve damper adjustor 920 which will provide any adjustment 950 information to active valve damper 38.

Evaluation Using Acceleration and PSD

In one embodiment, the sensor data is evaluated by sensor data evaluator 910 to determine acceleration magnitude and real time power spectral density (PSD) determinations. In general, PSD measures the power content of the sensor data signal versus the frequency of the sensor data 901. In one embodiment, the acceleration is measured in g's while the PSD is measured in watts per hertz (W/Hz). In general, PSD provides a measurement of the amount of "punch" that the event (e.g., bump) has given to the suspension.

In one embodiment, sensor data evaluator 910 will determine the acceleration magnitude and PSD from the sensor data 901. Sensor data evaluator 910 will monitor the input to determine when both the acceleration magnitude and the PSD breach a pre-defined threshold. For example, in one embodiment, the threshold for acceleration magnitude would be 5 g and the threshold for PSD is dependent upon user settings, manufacturer suggested, performance requirements and the like.

Once both the acceleration magnitude and the PSD breach their own pre-defined thresholds, sensor data evaluator 910 will provide the appropriate active valve damper 38 damping characteristics, thresholds, and settings to active valve damper adjustor 920 which will provide the adjustment 950 information to active valve damper 38.

In one embodiment, sensor data evaluator 910 will continue to calculate both the acceleration magnitude and the PSD to ensure that they are both remaining above their pre-defined thresholds. In one embodiment, if one or both of the acceleration magnitude and the PSD drop below their pre-defined thresholds, sensor data evaluator 910 will provide the previous damping characteristics, thresholds, and settings to active valve damper adjustor 920 which will provide the adjustment 950 information to active valve damper 38.

Evaluation using Acceleration

In one embodiment, the sensor data is evaluated by sensor data evaluator 910 to include the derivative of acceleration (referred to herein as Jerk) from the acceleration data. Jerk is expressed in m/s3 (SI units) or standard gravities per second (g/s).

In one embodiment, sensor data evaluator 910 will continuously determine the Jerk and apply a variance approach to the Jerk to detect rapid changes in the signal.

In one embodiment, performance database 940 will include a number of pre-identified Jerk signatures that have been previously associated with different types of terrain. For example, a gravel road will have a unique Jerk signature that is distinguishable from a paved road Jerk signature, a hard pack Jerk signature, etc.

In one embodiment, sensor data evaluator 910 will access the performance database 940 and correlate (or match, establish a level of similarity (e.g., 70% or greater match), and the like) the calculated Jerk from the sensor signal with one of the pre-identified Jerk signatures associated with different types of terrain. For example, sensor data evaluator 910 will calculate the Jerk from the sensor signal and determine that the calculated Jerk reaches the threshold to consider it analogous to the pre-identified Jerk signature associated with a gravel road.

In one embodiment, sensor data evaluator 910 will then access performance database 940 to obtain the appropriate damping settings for the gravel road. For example, the appropriate damping settings (e.g., gravel road settings) would include a bump threshold characteristic threshold such that the traveling along the gravel road will not be sufficient to trigger the suspension to open.

In one embodiment, sensor data evaluator 910 will compare the present damping characteristics, thresholds, and settings to determine if they are different from, or already set to, the gravel road settings. If the active valve damper 38 damping characteristics, thresholds, and settings are already set to the gravel road settings then no further actions would be needed.

In one embodiment, if the present active valve damper 38 damping characteristics, thresholds, and settings are not already set to the gravel road settings, sensor data evaluator 910 will provide the gravel road damping characteristics, thresholds, and settings to active valve damper adjustor 920 which will provide the adjustment 950 information to active valve damper 38.

In one embodiment, sensor data evaluator 910 will continue to calculate the Jerk to ensure that remains a match to the presently utilized gravel road Jerk signature. In one embodiment, if the real-time Jerk no longer matches the gravel road Jerk signature, sensor data evaluator 910 will perform another comparison and provide the new Jerk signature damping characteristics, thresholds, and settings to active valve damper adjustor 920 which will provide the adjustment 950 information to active valve damper 38.

In one embodiment, sensor data evaluator 910 will provide the gravel road damping characteristics, thresholds, and settings to active valve damper adjustor 920 which will provide the adjustment 950 information to active valve damper 38 as soon as the Jerk signature is identified.

In one embodiment, sensor data evaluator 910 will monitor the Jerk for a certain period of time before moving to the changed settings to ensure that the vehicle is remaining on the gravel road and did not just cross a gravel road or encounter only a small patch of gravel road. For example, in one embodiment, the sensor data evaluator 910 would evaluate the Jerk for 1-3 seconds in order to establish that the vehicle is continuing to be operated on a gravel road environment. In one embodiment, the evaluation time period could be much shorter or longer depending upon type of ride (e.g., race, training, fun, etc.), user settings, performance requirements (e.g., less than 2 seconds on a gravel road will not cause a significant change to performance, but more than 2 seconds will begin a noticeable performance degradation, etc.), and the like.

In one embodiment, if the present active valve damper 38 damping characteristics, thresholds, and settings are not already set to the gravel road settings, after the evaluation time period is achieved, sensor data evaluator 910 will provide the gravel road damping characteristics, thresholds, and settings to active valve damper adjustor 920 which will provide the adjustment 950 information to active valve damper 38.

Noise Floor Approach

In one embodiment, the vibration (e.g., sensor noise or noise not due to mechanical movement) coming from the surface of the ground has a certain acceleration noise which is a much higher frequency than a lower frequency when the sensor detects a discrete bump caused by hitting a rock or tree root (for example). This higher frequency noise floor creates an offset to the acceleration signal. In one embodiment, the frequency of bump input to the sensor is usually in the range of 1-50 Hz thus any frequency above 50 Hz would be considered the sensor noise. In one embodiment, the frequency of bump input to the sensor is in the range of 1-30 Hz thus any frequency above 30 Hz would be considered the sensor noise. In yet another embodiment, the frequency of bump input to the sensor is in the range of 1-30 Hz and any frequency above 50 Hz would be considered the sensor noise. Although a number of examples are provided, it should be appreciated that the actual values could be of a higher or lower range depending upon sensor metrics, manufacturer suggestions, performance requirements, rider preference, and the like.

For example, the bump threshold to change the suspension mode is set at approximately 5 g (or any other threshold setting selected by manufacturer, rider, or the like). However, while on the ride, the higher frequency noise floor is causing the sensor data evaluator 910 to continually determine a constant 3 g for acceleration magnitude (e.g., the road noise). Without adjustment, the sensor data evaluator 910 would have active valve damper adjustor 920 send the adjustment 950 commands to active valve damper 38 whenever an acceleration event of greater than 2 g occurred (e.g., 3 g background noise plus 2.1 g event). This would cause a softening of the suspension to occur well below the pre-set 5 g event threshold is met.

To overcome this problem, in one embodiment, sensor data evaluator 910 will modify the bump threshold value to be a value of 5 g+the higher frequency noise floor. For instance, using the above example, sensor data evaluator 910 continually determines a constant 3 g for the higher frequency noise floor acceleration magnitude (e.g., the road noise). As such, the sensor data evaluator 910 will adjust the bump threshold value to 8 g (e.g., 3 g floor noise+5 g threshold value). In so doing, the sensor data evaluator 910 would have active valve damper adjustor 920 send the adjustment 950 commands to active valve damper 38 whenever an acceleration event of greater than 8 g was determined by sensor data evaluator 910.

In one embodiment, instead of sensor data evaluator 910 modifying the bump threshold value to be a value of 5 g+the higher frequency noise floor, sensor data evaluator 910 will filter out the higher frequency noise floor. For instance, using the above example, sensor data evaluator 910 continually determines a constant 3 g for the higher frequency noise floor acceleration magnitude (e.g., the road noise). As such, the sensor data evaluator 910 will filter out the 3 g noise floor while keeping the bump threshold value at the 5 g threshold value. In so doing, the sensor data evaluator 910 would establish a base line at the higher frequency noise floor and have active valve damper adjustor 920 send the adjustment 950 commands to active valve damper 38 whenever an acceleration event of greater than 5 g above the base line, was determined by sensor data evaluator 910.

In one embodiment, sensor data evaluator 910 will continue to calculate the higher frequency noise floor (over a given period of time) and continually adjust the base line, the bump threshold range, or the like based on the most recent higher frequency noise floor. For example, in one embodiment, sensor data evaluator 910 would calculate the higher frequency noise floor average for a given period of time (such as every five minutes, two minutes, one minute, 30 seconds, n-minutes, n-seconds, etc.). The most recently determined higher frequency noise floor average would then be used for the time period required for the sensor data evaluator 910 to determine the next-in-time higher frequency noise floor average. Once the next-in-time higher frequency noise floor average was determined, it would replace the previous higher frequency noise floor average.

For example, in one embodiment, the higher frequency noise floor average is determined by sensor data evaluator 910 over a 2-minute time window. After the 2-minute time window ends, the higher frequency noise floor average is determined to be 2.2 g. During the next 2-minute time window, sensor data evaluator 910 would adjust the base line by filtering out 2.2 g from the acceleration signal data (or adjust the bump threshold range to 7.2 g), or the like. In addition, during the same time period, sensor data evaluator 910 would also be monitoring the higher frequency noise floor.

At, about, or right after the closing of the 2-minute time window, sensor data evaluator 910 would have a new next-in-time higher frequency noise floor average (for example, the average over the latest 2-minute time window was 1.5 g). This new average (1.5 g) would be used over the next 2-minute time window; e.g., sensor data evaluator 910 would adjust the base line by filtering out 1.5 g from the acceleration signal data (or adjust the bump threshold range to 6.5 g), or the like; and the cycle would continue to repeat.

In one embodiment, (e.g., in one or more of the above examples) instead of using a block of time approach, the sensor data evaluator 910 would continually adjust the higher frequency noise floor average over a rolling time period. In other words, the higher frequency noise floor is based on a rolling 2-minute average such that the higher frequency noise floor average would be continually updated by sensor data evaluator 910. For example, in one embodiment, starting after 2-minutes of time, sensor data evaluator 910 would set the higher frequency noise floor at 1.8 g (e.g., the average of the measurements taken from time zero to 2-minutes). The rolling 2-minute average would continue to be adjusted by throwing out measurements older than 2-minutes in the past and replacing them with the latest measurement. For example, at 5 minutes into the ride, the determined higher frequency noise floor would be set at the average of the measurements taken from time 3-minutes to 5-minutes. At 21 minutes and 20 seconds into the ride, the determined higher frequency noise floor would be set at the average of the measurements taken from time 19-minutes and 20-seconds to 21-minutes and 20-seconds. Etc.

In one embodiment, the first time period of the ride would have no noise floor, would have a noise floor average taken for the entirety of time until the first time period was completed, etc. Moreover, although 2-minutes is used herein, the time window may be larger or smaller and may be dependent upon type of ride (e.g., race, training, fun, etc.), user settings, performance requirements, manufacturer recommendation, or the like.

In one embodiment, the sensor data evaluator 910 will use one, some, a combination of different features of some or all of the different approaches, or all of the different approaches (e.g., evaluation using frequency, evaluation using acceleration and PSD, evaluation using acceleration, noise floor approach, etc.) to determine when the suspension should, or should not, be adjusted.

E-Sway Algorithm

Described herein is a system that offers semi-active control of vehicle dynamics through an adjustable sway-bar, with an electronic implementation to improve ride quality, handling, and safety. Benefits of the E-sway algorithm include: improved ride comfort in offset bumps, improved understeer/oversteer dynamics without compromising ride quality, improved articulation in low speed crawling maneuvers without compromising safety, and improved functional safety by rollover detection/prevention.

One benefit of the E-sway algorithm described herein is that it allows a user to run a disconnected sway bar, engaging the sway bar when necessary such as when the vehicle is about to roll over, in situations where a compromise would otherwise be made if the sway bar was constantly engaged. For example, when rock crawling a connected sway bar will limit the amount of articulation allowed between the wheels of the left and right side of the vehicle, so it would be ideal to disengage the sway bar when it is not required.

Another advantage is that the algorithm allows damping from the body motion, but not the wheel motion. By pairing this feature with a stiff sway bar and semi active damping links, it is possible to optimize the vehicle for comfort and cornering dynamics without making compromises to one or the other.

While described in left to right wheel suspension connections, it should be understood that the E-sway algorithm can also be applied to front and rear suspension connections.

In one embodiment, there are various operating modes the E-sway algorithm can be in. Such operating modes include: rock crawl, journey, baja, hero, and stock mode. It should be understood that the operation modes may also be referred to as algorithms.

In one embodiment, a user manually sets the mode through either a mechanical interface, or a GUI.

In one embodiment, the mode interface and tune settings for adjustments for the dampers/shock assemblies and sway bar system are displayed on a graphical user interface (GUI) and/or human machine interface (HMI) such as an infotainment system HMI/GUI (e.g., in-vehicle infotainment (IVI) system, or the like) where the IVI system or other device will provide an ability for the user to modify one or more of the settings. Further discussion and examples of an IVI control system and componentry are described in U.S. Pat. No. 10,933,710, the content of which is incorporated by reference herein, in its entirety.

In one embodiment, the IVI system may be integrated with the vehicle structure, suspension components, suspension component controller(s) and data processing system as described in U.S. Pat. Nos. 7,484,603; 8,838,335; 8,955, 653; 9,303,712; 10,060,499; 10,443,671; 10,737,546; and 10,933,710 the content of each of which are incorporated by reference herein, in their entirety. In one embodiment, the IVI system could incorporate vehicle systems consisting of one or more sensor(s), imagers, active valves, active damping components, suspension system controllers and the like. The principles of patents and other documents incorporated herein by reference, may be integrated one or more embodiments hereof, individually or in combination, as disclosed herein.

In one embodiment, the user can be prompted with a query on if they would like to switch operating modes. In one embodiment, an E-sway algorithm is used to automatically determine which operating mode will be most suitable based on the ride conditions vehicle 152 is experiencing.

Figure 10:
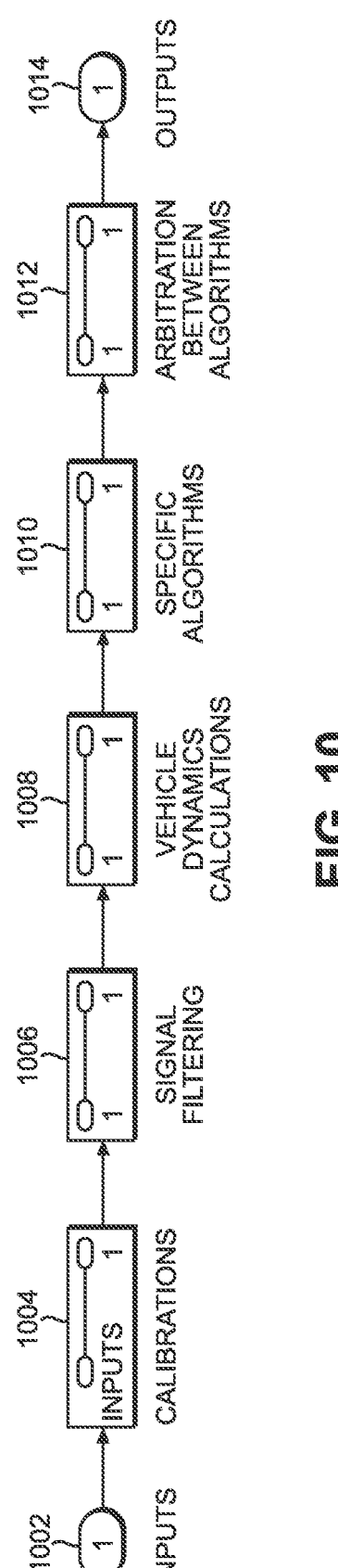
FIG. 10 is a flowchart of the E-sway algorithm, in accordance with an embodiment.

FIG. 10 is a flowchart 1000 of the E-sway algorithm, in accordance with an embodiment.

In one embodiment, using the previously described systems (such as those shown in at least FIGS. 6-9) and sensors 5, the E-sway algorithm can automatically switch between operating modes as needed. For example, if the vehicle is in rock crawl mode, but the E-sway algorithm determines that the vehicle is, say, on the road, then the E-sway algorithm will switch to a mode more suitable for on road driving. Similarly, if the vehicle is in a road appropriate mode and the E-sway algorithm determines that another mode, say, baja is more suitable then the E-sway algorithm will switch to the new mode. In one embodiment, this can be done by taking the inputs 1002 received from sensors 5, calibrating the inputs, signal filtering 1006, running calculations 1008, and using the results of those calculations to check which mode would be most effective (arbitration between algorithms 1012). In one embodiment, the output 1014 would be a solenoid command.

Figure 11:
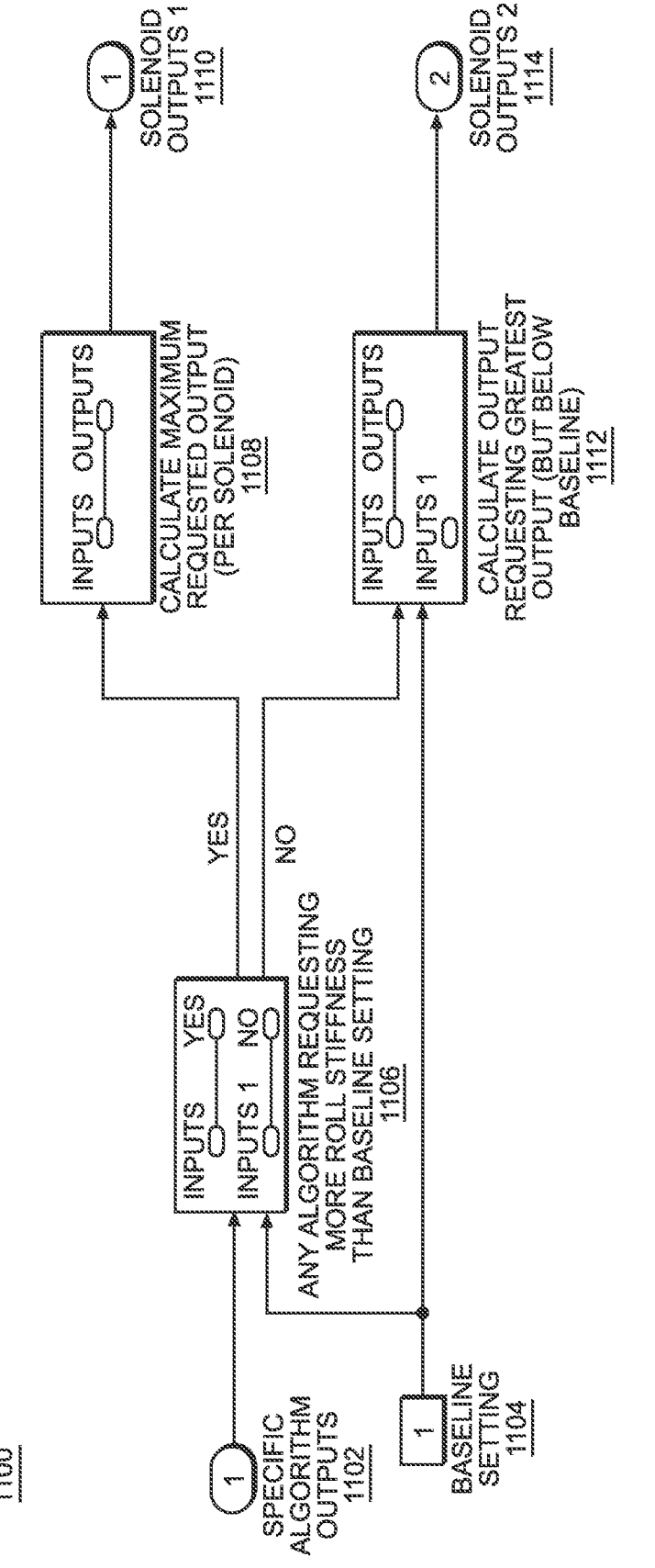
FIG. 11 is a flow chart illustrating a method for determining the operation mode, in accordance with an embodiment.

FIG. 11 is a flow chart 1100 illustrating a method for determining the operation mode, in accordance with an embodiment. In one embodiment, the specific algorithm output 1102 and a baseline setting 1104 are used as inputs to check if any of the operation modes require a higher stiffness level than the baseline setting 1104. If true, then the maximum requested output per solenoid 1108 is calculated and a solenoid command is the output 1110 of the algorithm. If false, then the greatest output 1112 that is still less than the baseline setting 1104 is calculated and a solenoid command is the output 1114 of the algorithm.

In one embodiment, a user can create a custom mode with custom tune settings. In one embodiment, a user can adjust the parameters of the E-sway algorithm operation modes to better suit their needs.

In one embodiment, rock crawl mode is ideal for when the vehicle is rock crawling. Rock crawl mode may also be referred to as a first mode. When rock crawling, it is ideal for the vehicle to have the maximum amount of articulation between the wheels of the left and right sides of the vehicle 152. While sway bars reduce the chances of the vehicle rolling over, they also limit the articulation to a value less than the maximum valve without a sway bar. As such, a compromise is usually made between articulation and rolling over.

In this first mode, the E-sway algorithm allows for additional articulation without risking rollover. One benefit of this first mode is that it allows for more articulation, but still acts to prevent the vehicle from rolling when necessary. In one embodiment, the E-sway algorithm has the sway bar 12 disengaged during rock crawl mode until certain conditions are met. In one embodiment, the E-sway algorithm has the sway bar 12 in a soft setting during rock crawl mode until certain conditions are met. In one embodiment, the Internal Measurement Unit (IMU) calculates the roll angle of the vehicle, and once the roll angle reaches a minimum threshold the sway bar 12 will reengage or stiffen. In one embodiment, the roll angle is based on a sensed angle of the vehicle, a combination of angle and speed, the steering wheel angle, sudden change in steering wheel angle, etc. In one embodiment, roll angle is calculated using the acceleration in the Y and Z axis. In one embodiment, roll angle is calculated using a complimentary filter. In one embodiment, roll angle is calculated using a Kalman filter.

In one embodiment, if certain conditions are met then the E-sway algorithm will change the operating mode. For instance, when the vehicle is in rock crawl mode and the speed exceeds a critical speed threshold (i.e., 15 mph) then the vehicle transitions to Baja mode.

In one embodiment, while in rock crawl mode and the sway bar 12 is either disengaged or in a soft setting, the E-sway algorithm will monitor the steering wheel turn velocity and reengages the bar or full bar stiffness if the steering wheel is steered too quickly while the vehicle 152 is at an angle, calculated by the IMU. For instance, if the user is rock crawling and steers the wheel too quickly, in a manner that might roll the vehicle, then the bar engages or stiffens to reduce the roll severity.

Figure 15:
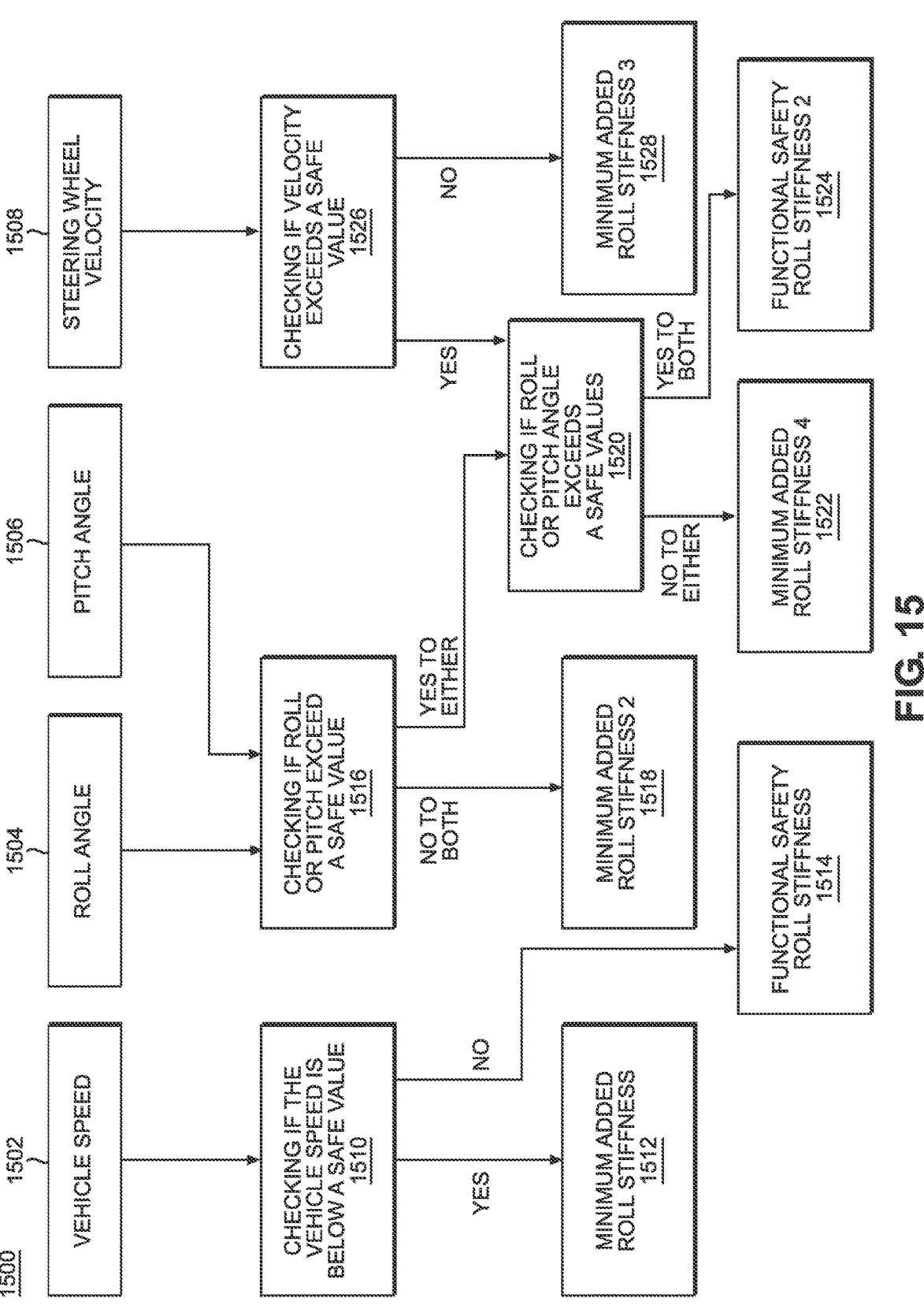
FIG. 15 is a flow chart illustrating an example of the rock crawling control algorithm during an abrupt steering change, in accordance with an embodiment.

FIG. 15 is a flow chart illustrating an example of the rock crawling control algorithm 1500 during an abrupt steering change, in accordance with an embodiment. In one embodiment, the inputs used are vehicle speed 1502, roll angle 1504, pitch angle 1506, and steering wheel velocity 1508. The vehicle speed is then compared to a safe value at 1510. If the vehicle speed is below the safe value, then the output is the minimum added roll stiffness 1512. If the vehicle speed is not below the safe value, then the output is the functional safety roll stiffness 1514. These outputs can then be used to send commands to at least one solenoid to adjust the wheel suspension, sway bar 12 stiffness, or both.

Alongside checking the vehicle speed, the absolute value of the roll angle 1504 and the absolute value of the pitch angle 1506 are compared to a first safe value 1516. If neither exceed the first safe value, then the output is the minimum added roll stiffness 1518. If either value exceeds the first safe value, then the absolute value of the roll angle 1504 and the absolute value of the pitch angle 1506 are compared to a second safe value 1520. If either are below the second safe value, then the output is the minimum added roll stiffness 1522. If both values exceed the second safe value, then the output is the functional safety roll stiffness 1524.

Finally, the steering wheel velocity 1508 is used as an input to check if the steering wheel velocity exceeds a safe value at 1526. If it does not exceed the safe value, then the output is the minimum added roll stiffness 1528. If it does exceed the safe value, then the absolute value of the roll angle 1504 and the absolute value of the pitch angle 1506 are compared to a second safe value 1520. If either are below the second safe value, then the output is the minimum added roll stiffness 1522. If both values exceed the second safe value, then the output is the functional safety roll stiffness 1524.

In one embodiment, the flow chart shown in at least FIG. 15 outlines the algorithm used to disconnect the roll bar in situations where doing so would optimize the traction and or articulation of the vehicle by monitoring inputs that would require intervention.

In one embodiment, journey mode is ideal for situations when the vehicle experiences a change in the load or fuel. Journey mode may also be referred to as a second mode. In one embodiment, journey mode can be automatically enabled or disabled based on parameters such as the suspension position, vehicle fuel level, and seat/seatbelt sensors (i.e., number of passengers or weight in the seats). For example, if a heavy load is placed on vehicle 152 then the E-sway algorithm will compensate with either additional stiffness of the suspension, or different algorithm parameters. Further, upon removal of the heavy load journey mode will be turned off.

As another example, in a race the E-sway algorithm can compensate for the effect of a decreasing fuel load by changing the settings of the sway bar system or suspension.

In one embodiment, baja mode is ideal for offroad situations. Baja mode may also be referred to as a third mode.

In one embodiment, the E-sway algorithm when in baja mode ideally keeps the sprung mass of vehicle 152 as steady as possible though control of the suspension dampers and sway bar. In one embodiment, baja mode utilizes swayhook control, which is modified from damper control to sway-bar control and adapted for roll-mode only operations.

In one embodiment, baja mode allows for separate articulation of the left and right wheels 10 of vehicle 152 which gives the vehicle a high level of side bump compliance. In one embodiment, the left and right side dampers are never activated at the same time, leading to greater comfort over out of phase bumps without increasing chassis motion. For example, if vehicle 152 is side-hilling and hits a bump on the high-side of the vehicle, sensors 5 sense the roll rate in the direction of the roll angle and controller 39 sends a command to stiffen sway bar 12. In another example, vehicle 152 is side-hilling and hits a bump on the low-side of the vehicle, sensors 5 sense the roll rate in the opposite direction of roll angle and controller 39 sends a command to soften sway bar 12. Alternatively, controller 39 sends a command to maintain the stiffness of sway bar 12.

In one embodiment, baja mode utilizes a filtering effect based on calculations from the IMU. In other words, the sprung mass experiences little discomfort from typical vibrations and bumps experienced during use as the suspension and sway bar settings are soft during high speed, high-frequency roll inputs and firm based on body motion. In one embodiment, this mode is an "IMU only" mode for use in an aftermarket kit where the vehicle speed, steering wheel angle, or other sensors are unavailable.

Figure 13:
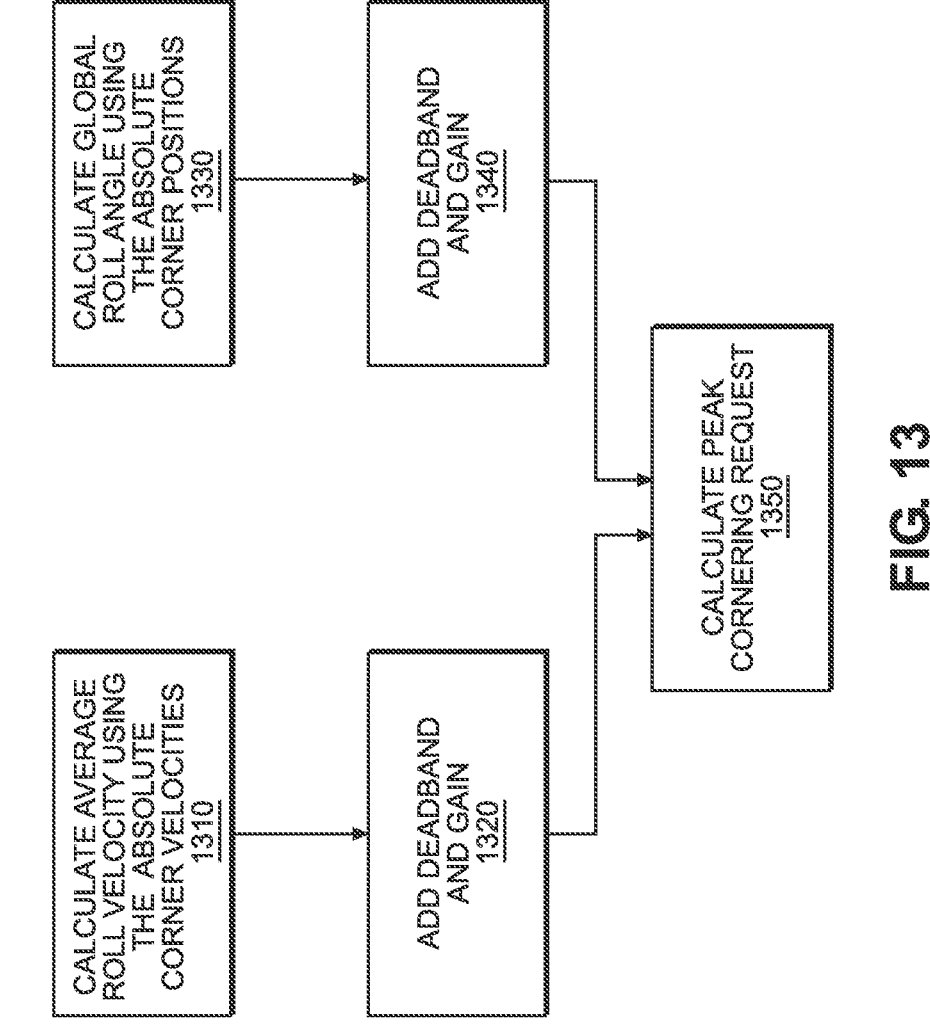
FIG. 13 is a flow chart illustrating a method for a swayhook control algorithm, in accordance with an embodiment.

FIG. 13 is a flow chart illustrating a method for a swayhook control algorithm 1300, in accordance with an embodiment. In one embodiment, the method includes, at 1310, calculating the average roll velocity using the absolute values of the corner velocities (in other words, the absolute value of the velocity for each corner of the vehicle). At 1320, a table is used to look up the deadband and the gain values. Concurrently to the previous steps, the method also includes, at 1330, calculating the global roll angle using the absolute value of the corner positions (in other words, the absolute value of the position for each corner of the vehicle). At 1340, a table is used to look up the deadband and the gain values. At 1350, the results from 1320 and 1340 are used to calculate the value of the peak cornering request. In one embodiment, this method is used to control the sway bar 12 based on the output values.

Figure 14:
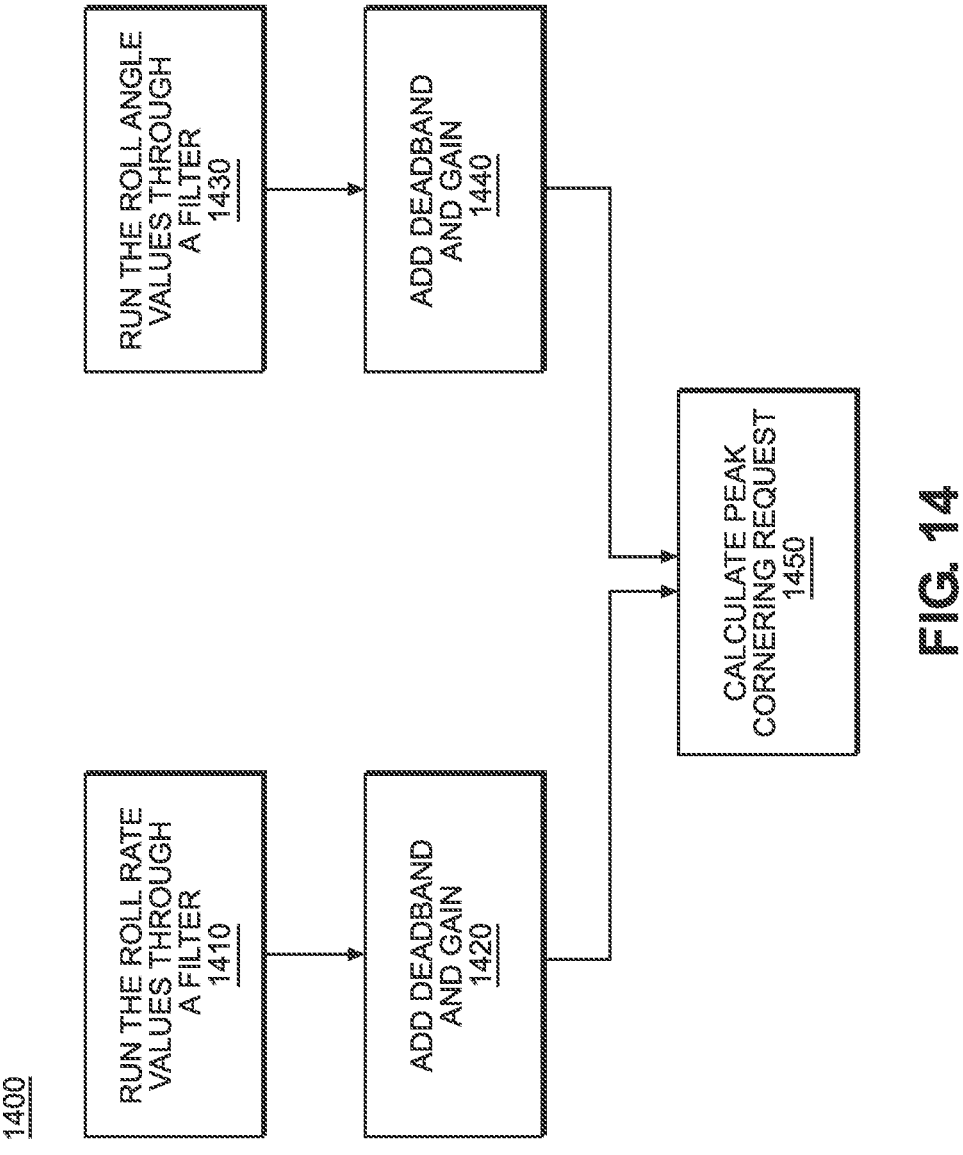
FIG. 14 is a flow chart illustrating a method for a swayhook control algorithm, in accordance with an embodiment.

FIG. 14 is a flow chart illustrating a method for a swayhook control algorithm 1400, in accordance with an embodiment. In one embodiment, the method includes, at 1410, running the roll rate values through a filter to prepare the data. At 1420, a table is used to look up the deadband and the gain values. Concurrently to the previous steps, the method also includes, at 1430, running the roll angle values through a filter to prepare the data. At 1440, a table is used to look up the deadband and the gain values. At 1450, the results from 1420 and 1440 are used to calculate the value of the peak cornering request. In one embodiment, this method is used to stabilize the vehicle through the sway bar based on the vehicle roll angle and roll rate.

In one embodiment, hero mode is ideal for on road cornering situations. Hero mode may also be referred to as a fourth mode. In one embodiment, hero mode utilizes a soft setting for the sway bar when not cornering, and adjusts the sway bar stiffness as necessary during cornering events.

In one embodiment, hero mode predicts a lateral acceleration "request" before the peak steering wheel angle is reached. In one embodiment, the lateral acceleration is calculated based on inputs from a yaw rate sensor and the vehicle speed (which can be obtained from, say, wheel speed sensors). In one embodiment, the requested lateral acceleration is calculated using the vehicle speed and the steering wheel angle, along with constants such as the steering ratio, wheel base, and understeer gradient.

For example, when steering into a corner the user will turn the steering wheel from straight ahead to turning, the E-sway algorithm predicts how much lateral acceleration the driver will be requesting at a peak steering angle based on the rate of steering/turning and the vehicle speed. In one embodiment, a high-pass filter on the steering wheel angle sensor is used in place of steering velocity for this parameter. This embodiment allows the system to stiffen before body-roll occurs as well as compensate for mechanical and electrical lag in the system. The E-sway algorithm predicting lateral acceleration is used to optimize corner entry by quickly changing the front to rear roll stiffness distribution by adjusting the suspension, sway bar 12, or both.

In one embodiment, hero mode also helps avoid disengaging or softening the sway bar 12 under conditions when a user is making corrections to the steering, or counter steering. In other words, in embodiments where the position, velocity, or acceleration of the steering wheel is used as a threshold parameter, if a user is adjusting their turning radius the E-sway algorithm will not mistakenly soften or disengage the sway bar 12 such that the vehicle would then roll over. In one embodiment, instead of using steering velocity, a high-pass filter is used on the collected data for the steering wheel angle with the filtered data being processed in the E-sway algorithm. For example, if a vehicle 152 is yawing while cornering and the yaw becomes too great which causes the driver to countersteer, then the yaw sensor (i.e., sensor 5) still detects yaw and holds the sway bar 12 on the outer side, while the steering sensor detects the opposite angle and prestiffens the inside corner for the change in direction.

In one embodiment, hero mode allows for an optimized corner exit by controlling the yaw rate. In one embodiment, the E-sway algorithm softens the sway bar as the yaw rate decreases, allowing for greater rear traction on the outside rear corner of vehicle 152.

FIG. 12 is a flow chart illustrating a method for a predictive cornering algorithm 1200, in accordance with an embodiment. In one embodiment, the method includes, at 1210, calculating the lateral acceleration using the yaw rate and the vehicle speed. At 1220, a table is used to look up the deadband and the gain values. At 1230, the value for steady state cornering is calculated. Concurrently to the previous steps, the method also includes, at 1240, calculating the requested lateral acceleration using the steering wheel angle and vehicle speed. At 1250, a table is used to look up the deadband and the gain values. At 1260, the data is run through a high pass filter to predict the peak angle request based on the steering wheel velocity. Finally, at 1270, the peak cornering request is calculated. In one embodiment, this method is used to predict the peak lateral acceleration that will be requested from the steering wheel velocity, and maintains the position based off the steady state calculated lateral acceleration.

In one embodiment, stock mode is ideal for comfort and cornering situations. Stock mode may also be referred to as a fifth mode. In one embodiment, stock mode uses a position sensor to adjust the sway bar such that a softer suspension setting is mimicked without making compromises on the suspension settings, in one embodiment, this is done while the vehicle 152 rolls which is measured by suspension position sensors.

In one embodiment, the modes of the E-sway algorithm account for sway bars that have a binary state of engaged and disengaged, and adjusts the settings while accounting for the lack of intermediate states. In such an embodiment, the E-sway algorithm would have a lower threshold and an upper threshold above and below which the E-sway algorithm would change the state of sway bar 12, with no changes happening when the input data is between the minimum and maximum threshold.

In other words, in one embodiment there is a latching algorithm that allows sway bar 12 to engage at an upper percent based on other algorithms and arbitration, and allows sway bar 12 to disengage at a lower percent also based on other algorithms and arbitration. In one embodiment, the upper and lower values are adjustable by a tuner. In one embodiment, the upper and lower values vary between operation modes. In one embodiment, the upper and lower values can vary based on vehicle specifications and aftermarket adjustments.

In one embodiment, the modes of the E-sway algorithm account for sway bars that only have one electronically controlled damper link 14 on a first end of sway bar 12. In one embodiment, the modes of the E-sway algorithm account for sway bars that only have electronically controlled physical disconnect 93 on a first end of sway bar 12.

Limited Range Sharing of Vehicle Setup Information

Suspension tuning is a highly subjective field—it is sometimes the case that one set of suspension parameters (or a 'tune') may be optimal for one rider or one vehicle but may not apply to another rider—even on the same bicycle. Conversely, there are also instances where one rider's tune, which was the result of several hours (or days) of testing, may be perfectly applicable to a similar rider. Sharing these parameters is an essential component of the tuning process. However, it is oftentimes very difficult to communicate one set of settings to another rider, as their technical proficiencies or ability to interpret settings may differ drastically.

As more semi-active or electronically-assisted suspension systems are entering the market, these parameters have become increasingly complex and/or nuanced. Additionally, it can be difficult to adjust these parameters in the field, particularly where internet or cellular data access is limited or non-existent.

Embodiments allow a user to share and/or obtain some or all of a vehicle setup information (e.g., suspension setup information for a specific road, trail, location, area, etc., e.g., "localized") for a vehicle regardless of access to Internet or cellular data access.

In one embodiment, the sharing of the vehicle setup information can occur locally using scannable information and a scanning device. In one embodiment, the scannable information is written information or information in a 2D or 3D code (such as a QR code, any of the other data transfer formats described herein, or the like). In one embodiment, the scanning device utilizes an image capture capability, such as a camera of a mobile device or the like. In one embodiment, the sharing of the vehicle setup information is used without requiring any type of network connectivity, e.g., scanned with a device having no connectivity capabilities, or in an area where the mobile device has limited or no cellular or Internet connectivity. In one embodiment, the sharing of the vehicle setup information is used between one or more devices having connectivity capabilities, and/or cellular and Internet connectivity.

In one embodiment, since the vehicle setup information is shared and/or obtained by the vehicle setup application, it is platform neutral (e.g., it does not matter what OS the underlying device is using).

For example, the vehicle that is providing the vehicle setup information could have one or more tunable components, a given set of geometries, be a certain make/model/year, have a user specific skill level, a user specific physical information, and other information such as, but not limited to, vibration isolators, weights and their locations, aerodynamic structure(s), location(s), and/or position(s), seat height, brake angle, stem angle, and the like.

In one embodiment, the vehicle receiving the vehicle setup information may have one or more different tunable components, set of geometries, make/model/year, user specific skill level and physical information, and/or other information such as, but not limited to, vibration isolators, weights and their locations, aerodynamic structure(s), location(s), and/or position(s), seat height, brake angle, stem angle, and the like.

In a multi-wheeled vehicle, such as for example, a car, truck, side-by-side, an on-road and/or off-road vehicle, or the like, the suspension tune could modify the tune for one or more E-sway bar(s) for example a front E-sway bar and/or a rear E-sway bar. In one embodiment, E-sway bar tune information can include disconnecting the E-sway bar for soft, rocky, and/or sandy terrain, connecting the E-sway bar for harder surfaces, higher speeds, etc. In one embodiment, the E-sway bar tune would provide one or more threshold speeds, location based settings (e.g., geofences or the like), terrain determinations and the like and adjust the E-sway bar connection based on the present vehicle speed, terrain being traversed, and the like. In one embodiment, to adjust the stiffness of a sway bar system, the E-sway bar tune information can include adjustment settings for a sway bar damper link that couples the sway bar with the vehicle.

In one embodiment, the might be a number of E-sway bar tunes that would be based on the type of driving. For example, there might be a rock crawling tune, a Baja driving tune, an optimized cornering tune, or the like. In one embodiment, the E-sway bar tunes could also be modified based on vehicle specific aspects such as vehicle load/weight, different components within the suspension (e.g., different spring setup, etc.).

In one embodiment, the different tunes for the E-sway bar could be manually used (e.g., the user change to a different tune/map/mode, etc., automatically used (e.g., location based, sensor input based, etc.) Additional information regarding E-sway setup and operation can be found in U.S. Patent Application 2022/194161 the content of which is incorporated by reference herein, in its entirety.

In one embodiment, the E-sway bar tunes/parameters could be shared by themselves. In one embodiment, the E-sway bar tunes/parameters could be shared in conjunction with the suspension setting(s) and/or any other shared vehicle parameters.

In one embodiment, the E-sway algorithm compares a global roll angle and predicted future angle (based on velocity and acceleration) to determine if the sway bar should be stiffened to prevent the vehicle from rolling.

In one embodiment, the E-sway algorithm has drift control that actively controls vehicle roll-stiffness during periods of high side-slip angle. At very low slip angles the sway bar stiffness is high to initiate rotation. Above a side-slip angle threshold, rear roll stiffness is reduced to aid when ending excessive yaw angle.

In one embodiment, the E-sway algorithm has jump detection that softens the sway bar during periods of free-fall to reduce impact during out of phase landings. In one embodiment, the E-sway algorithm also monitors roll and pitch angle to assure that they are within a safe value or range.

In one embodiment, functions that can request a reduction in roll stiffness include: high throttle softening that softens the sway bar during periods of high torque-request to improve traction at the rear tires, and braking of downhill situations where it softens the sway bar during downhill driving to account for vehicle weight shift.

In one embodiment, vehicle loading can request a change in roll stiffness based on vehicle loading where input from a user or the monitors for the suspension position sensors can adjust the sway bar to compensate for different vehicle-loading or different vehicle fuel levels.

In one embodiment, vehicle CG height can request a change in roll stiffness based on the monitors for the suspension position against lateral acceleration to model the changing roll gradient of the vehicle can adjust the sway bar for conditions such as adding load to floor of vehicle vs roof, or raised ride height of the vehicle such as through spring perch adjustment by user for different terrains.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A system for controlling suspension in a vehicle using a predictive cornering process, said system comprising:
    a suspension component;
    a memory coupled with said suspension component;
    at least one sensor coupled with said vehicle;
    at least one processor coupled with said at least one sensor, said at least one processor configured to:
        obtain vehicle information from said at least one sensor;
        determine a vehicle operation mode using said predictive cornering process based on said vehicle information, said predictive cornering process comprising:
            calculating a current lateral acceleration for said vehicle using a yaw rate and a current speed of said vehicle;
            obtaining deadband and gain values corresponding to said yaw rate to calculate a steady state cornering value for said vehicle;
            using steering wheel data and said current speed of said vehicle to calculate a requested lateral acceleration value for said vehicle;
            obtaining deadband and gain values corresponding to said steering wheel data;
            predicting peak angle request data for said vehicle based upon said steering wheel data; and;

utilizing said peak angle request data to determine a peak cornering request for said vehicle;
        format said vehicle operation mode in a computer readable format; and
        present said vehicle operation mode in a computer readable format, wherein the processor automatically switches between operating modes based on the vehicle information and said peak cornering request for said vehicle.

2. The system of claim 1 wherein, said vehicle operation mode is presented to at least one solenoid for execution.

3. The system of claim 1 wherein, the vehicle operation mode is determined by comparing said vehicle information to a set of baseline settings.

4. The system of claim 1 wherein, said vehicle operation mode consists of a multitude of predetermined tunes based on various use cases.

5. The system of claim 1 wherein, said vehicle operation mode is changed if said vehicle information indicates that the vehicle will roll over.

6. The system of claim 1 wherein, said vehicle operation mode is shared with a second processor.

7. A system for controlling components in a vehicle using a swayhook control process, said system comprising:
    one or more adjustable components configured to be coupled with said vehicle;
    a memory coupled with said one or more adjustable components;
    at least one sensor coupled with said vehicle;
    at least one processor coupled with said at least one sensor, said at least one processor configured to:
        receive vehicle information from said at least one sensor;
        generate a vehicle e-sway bar operation mode based on said vehicle information, using said swayhook control process, said swayhook control process comprising:
            calculating an average roll velocity for said vehicle using an absolute value of a velocity for each corner of said vehicle;
            obtaining deadband and gain values corresponding to said absolute value of said velocity for each corner of said vehicle;
            calculating a global roll angle for said vehicle using an absolute value of a corner position for each corner of said vehicle;
            obtaining deadband and gain values corresponding to said absolute value of said corner position for each corner of said vehicle; and
            calculate a peak cornering request for said vehicle; and
        automatically provide said vehicle e-sway bar operation mode to said one or more adjustable components for implementation thereon.

8. The system of claim 7 wherein, said vehicle e-sway bar operation mode is presented to at least one electronically controlled e-sway bar disconnect for execution, said at least one electronically controlled e-sway bar disconnect selected from the group consisting of: a liner actuator, a rotary actuator, a solenoid, an electronically controllable coupling feature, and a bushing.

9. The system of claim 7 wherein, the processor automatically switches between operating modes based on the vehicle information.

10. The system of claim 7 wherein, the vehicle e-sway bar operation mode is determined by comparing said vehicle information to a set of baseline settings.

11. The system of claim 7 wherein, said vehicle e-sway bar operation mode consists of a multitude of predetermined tunes based on various use cases.

12. The system of claim 7 wherein, said vehicle e-sway bar operation mode is changed if said vehicle information indicates that the vehicle will roll over.

13. The system of claim 7 wherein, said vehicle e-sway bar operation mode is shared with a second processor.

14. A method for receiving and implementing a computer readable vehicle operation mode using a predictive cornering process, said method comprising:

receiving vehicle information from at least one sensor;

generating a vehicle operation mode based on said vehicle information, wherein said vehicle operation mode is generated using said predictive cornering process, said predictive cornering process comprising:

calculating a current lateral acceleration for said vehicle using a yaw rate and a current speed of said vehicle;

obtaining deadband and gain values corresponding to said yaw rate to calculate a steady state cornering value for said vehicle;

using steering wheel data and said current speed of said vehicle to calculate a requested lateral acceleration value for said vehicle;

obtaining deadband and gain values corresponding to said steering wheel data;

predicting peak angle request data for said vehicle based upon said steering wheel data;

utilizing said peak angle request data to determine a peak cornering request for said vehicle; and automatically providing said vehicle operation mode to one or more adjustable components coupled with said vehicle for implementation thereon.

15. The method of claim 14 wherein, said vehicle operation mode is presented to at least one solenoid for execution.

16. The method of claim 14 wherein, the vehicle operation mode is determined by comparing said vehicle information to a set of baseline settings.

17. The method of claim 14 wherein, said vehicle operation mode consists of a multitude of predetermined tunes based on various use cases.

18. The method of claim 14 wherein, said vehicle operation mode is changed if said vehicle information indicates that the vehicle will roll over.

19. The method of claim 14 wherein, said vehicle operation mode is shared with a second processor.

20. The system of claim 1 wherein, said vehicle suspension component is an e-sway bar.

21. A system for electronically and automatically altering a roll gradient of a vehicle using a swayhook control process, said system comprising:

at least one sensor coupled with said vehicle; and at least one processor coupled with said at least one sensor, said at least one processor configured to:

receive vehicle lateral acceleration information from said at least one sensor;

generate a vehicle e-sway bar operation mode based on said vehicle lateral acceleration information, using said swayhook control process, said swayhook control process comprising:

receive and filter roll rate values for said vehicle;

obtaining deadband and gain values corresponding to said roll rate values for said vehicle;

receive and filter roll angle values for said vehicle;

obtaining deadband and gain values corresponding to said roll angle values for said vehicle; and calculate a peak cornering request for said vehicle; and automatically provide said vehicle e-sway bar operation mode to one or more components of said vehicle to alter lateral acceleration of said vehicle based upon said roll rate values and said roll angle values for said vehicle.

* * * * *